(12) United States Patent
Hironaka et al.

(10) Patent No.: US 10,846,012 B2
(45) Date of Patent: Nov. 24, 2020

(54) STORAGE SYSTEM FOR MINIMIZING REQUIRED STORAGE CAPACITY DURING REMOTE VOLUME REPLICATION PAIR DUPLICATION

(71) Applicant: HITACHI, LTD., Tokyo (JP)

(72) Inventors: Kazuei Hironaka, Tokyo (JP); Tomohiro Kawaguchi, Tokyo (JP); Takaki Matsushita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 21 days.

(21) Appl. No.: 16/298,608

(22) Filed: Mar. 11, 2019

(65) Prior Publication Data

US 2020/0097180 A1   Mar. 26, 2020

(30) Foreign Application Priority Data

Sep. 21, 2018   (JP) ................. 2018-178065

(51) Int. Cl.
*G06F 12/00*    (2006.01)
*G06F 3/06*     (2006.01)
*G06F 11/08*    (2006.01)
*G06F 11/14*    (2006.01)

(52) U.S. Cl.
CPC ............ *G06F 3/065* (2013.01); *G06F 3/0619* (2013.01); *G06F 3/0665* (2013.01); *G06F 11/08* (2013.01); *G06F 11/1448* (2013.01); *G06F 11/1464* (2013.01); *G06F 2201/84* (2013.01)

(58) Field of Classification Search
CPC ........ G06F 3/065; G06F 3/0619; G06F 11/08; G06F 11/1464; G06F 3/0665; G06F 11/1448; G06F 2201/84
USPC ....................................................... 711/162
See application file for complete search history.

(56) References Cited

U.S. PATENT DOCUMENTS 7,149,859 B2 *  12/2006  Fujibayashi .......... G06F 3/0607
                                                      711/162
2009/0271582 A1  10/2009  Ninose
2017/0017433 A1   1/2017  Ishikawa et al.

FOREIGN PATENT DOCUMENTS

WO    2015/189925 A1    12/2015

* cited by examiner

*Primary Examiner* — Mardochee Chery
(74) *Attorney, Agent, or Firm* — Volpe Koenig

(57) ABSTRACT

According to one embodiment, a storage system includes a first storage device and a second storage device. In a case where the first storage device performs writing or updating of data on a first primary volume, the first storage device transmits the data to a second storage device based on a first replication pair. In a case where the first storage device creates or updates a second primary volume that is a snapshot of the first primary volume, the second storage device creates or updates a second secondary volume that is a snapshot of the first secondary volume configuring the first replication pair with the first primary volume.

11 Claims, 16 Drawing Sheets

COMPARATIVE EXAMPLE

FIG. 5
HDEV TABLE
4100

| HDEV NUMBER | CAPACITY | VOL TYPE | POOL NUMBER |
|---|---|---|---|
| 1 | 1TB | EVOL | 1 |
| 2 | 2B | TPVOL | 1 |
| 3 | 320GB | TPVOL | 1 |
| 4 | 500GB | RVOL | 2 |
| ... | ... | ... | ... |

FIG. 6
POOL TABLE
4200

| POOL NUMBER | POOL CAPACITY | POOL ALLOCATION CAPACITY | POOL USE CAPACITY |
|---|---|---|---|
| 1 | 10TB | 4TB | 1TB |
| 2 | 20TB | 4TB | 2.2TB |
| 3 | 30TB | 10TB | 8TB |
| ... | ... | ... | ... |

FIG. 10
PAIR MANAGEMENT TABLE
4600

| R PAIR# | J PAIR# | PVOL# | PAIR DEVICE ID | SVOL# | SYNCHRONIZATION METHOD | PAIR STATE |
|---|---|---|---|---|---|---|
| 1 | 1 | 1 | 10001 | 1 | SYNC | PAIR |
| 2 | 2 | 2 | 10000 | 2 | ASYNC | PSUS |
| 3 | 3 | 3 | - | - | - | - |
| ... | ... | ... | ... | ... | ... | ... |

FIG. 11
JNL MANAGEMENT TABLE
4700

| J PAIR# | SOURCE JVOL# | PAIR DEVICE ID | TARGET JVOL# | LATEST JNL# | REFLECTION JNL# |
|---|---|---|---|---|---|
| 1 | 1 | 10001 | 1 | 62 | 56 |
| 2 | 2 | 10000 | 2 | 2678 | 1987 |
| ... | ... | ... | ... | ... | ... |

STORAGE SYSTEM FOR MINIMIZING REQUIRED STORAGE CAPACITY DURING REMOTE VOLUME REPLICATION PAIR DUPLICATION

BACKGROUND OF THE INVENTION

1. Field of the Invention

The present invention generally relates to a data process performed by a storage system.

2. Description of Related Art

A storage system used in a company generally redundantly configures one or more devices and is operated by improving availability and reliability of the system. Examples of a technology related to such a storage system may include the following technologies.

US 2009/0271582 specification discloses an information system capable of improving availability. According to US-A-2009/0271582 specification, a first volume of a first storage device and a second volume of a second storage are provided to a host as the same volume. The host recognizes the first volume and the second volume as the same volume connected via different routes.

WO 2015/189925 pamphlet discloses a high availability (HA) pair configuration in which a first volume of a first storage device and a second volume of a second storage device respond the same virtual ID to a host computer, respectively. According to WO-A-2015/189925 pamphlet, in a case where the first storage device or the second storage device receives a data copy instruction designating the virtual ID as a copy destination from the host, the first storage device or the second storage device selects any of the first volume or the second volume as a copy source volume according to a storage device having the copy source volume and copies data from the copy source volume to the copy destination volume.

In the following description, a copy of data between volumes is particularly referred to as "replication".

In recent years, many of companies are required to comply with a business continuity plan (BCP) of IT systems in order to reinforcing their business continuity or resiliency in a case where an emergency event such as natural disaster. Even in a storage system that is able to store important data securely, it is also necessary to cope with the BCP and disaster recovery (DR). Assuming that, the storage system generally provides a volume replication feature that is configuring a replication pair (volume pair for remote replication) between multiple storage devices.

Specifically, the storage system has a disaster recovery (DR) feature, the storage system synchronizes data of a primary volume of a first storage device installed in a first datacenter and data of a secondary volume of a second storage device installed in a second datacenter (the primary volume and the secondary volume configure a volume pair). In this configuration, in a case where one of datacenter is unavailable, it is possible to continue to operate the IT systems necessary for the business continuity by failing over to the another datacenter that is not suffered from the disaster.

In addition, from the viewpoint of the BCP, it is also necessary to periodically implement testing/drilling of the DR operation described above to check if failover procedures and operations are working correctly.

However, when implementing the failover test described above, it is necessary to avoiding stability disturbance of the production (in-using) IT systems during the test. In addition, when the test is implemented, it is necessary to perform the test including not only the storage system itself but also a host computers connected to the storage system and running application on the hosts (e.g. database system). Therefore, when performing the test, the test is demanded to use the same data, storage system configuration as the in-use IT systems.

To meet this demand, it is considered to construct the same data/storage configuration replication pair as a production system in a test environment.

One possible embodiment for this purpose, it is configuring an additional replication pair for testing/drilling purpose. In other words, it means duplicating an existing replication pair. However, this duplicated replication pair is only necessary during the test. Therefore, in terms of cost savings on IT systems for the test implementation, it is demanded for minimizing required storage capacity and operational cost related to the construction of the replication pair as much as possible.

SUMMARY OF THE INVENTION

The objective of the present invention is to realize and minimize the required storage capacity and data process load in the storage system that related for volume replication pair duplication.

In a case where a first storage device performs writing or updating of data on a first primary volume, the first storage device transmits the data to a second storage device based on a first replication pair. In a case where the first storage device creates or updates a second primary volume that is a snapshot of the first primary volume, the second storage device creates or updates a second secondary volume that is a snapshot of the first secondary volume configuring the first replication pair with the first primary volume.

The effect of the present invention is to minimize both required storage capacity and data processing load for volume replication pair duplication process at the storage system.

BRIEF DESCRIPTION OF THE DRAWINGS

FIG. 5 shows an example of a configuration of an HDEV table;

FIG. 6 shows an example of a configuration of a pool table;

FIG. 10 shows an example of a configuration of a pair management table;

FIG. 11 shows an example of a configuration of a JNL management table;

DESCRIPTION OF EMBODIMENTS

Figure 1:
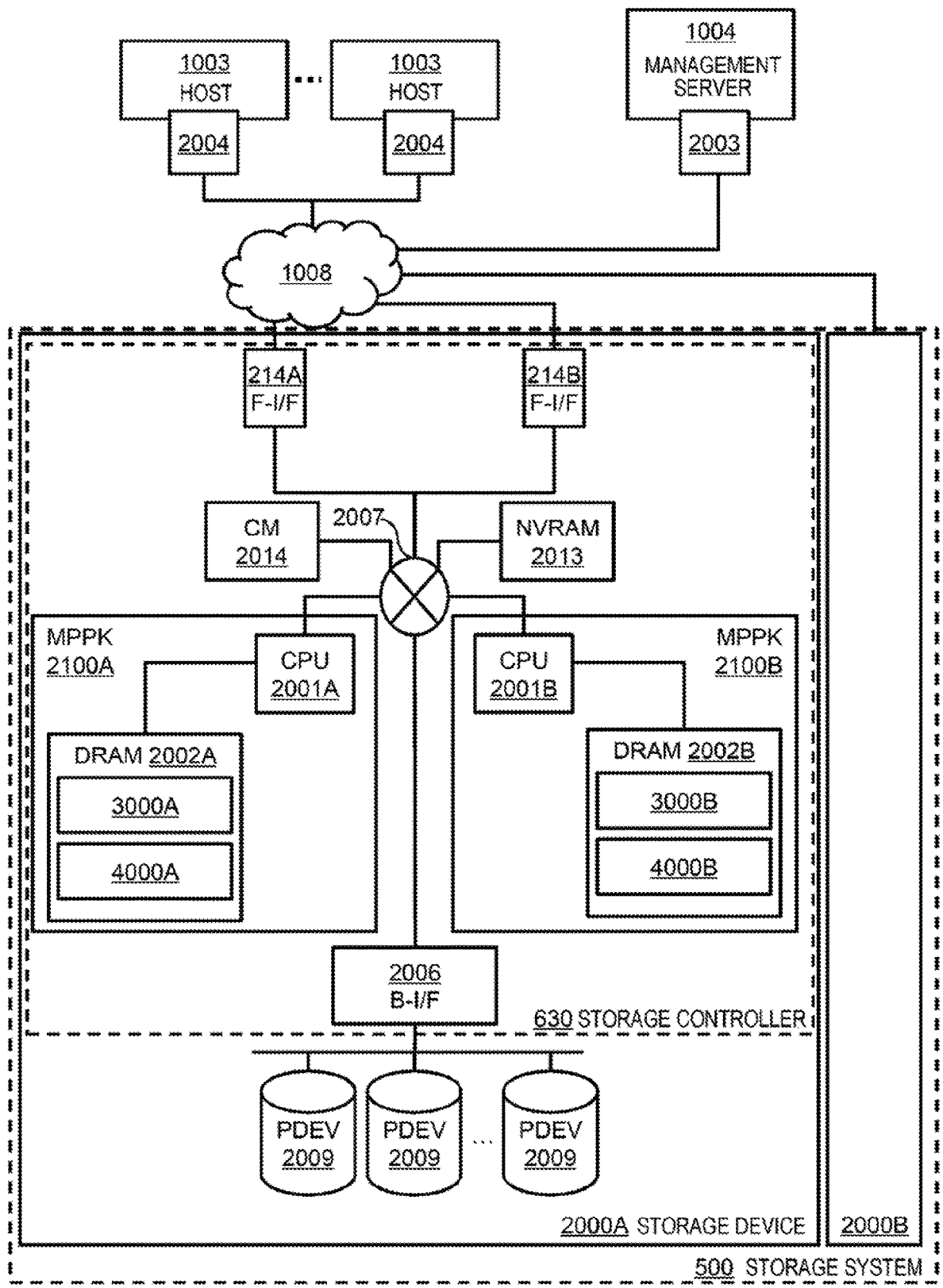
FIG. 1 shows an example of an overall configuration of a system including a storage system according to an embodiment.

An embodiment of the present invention will be described with reference to the drawings.

Note that, the embodiment described below does not limit the invention according to the claims, and all combinations of elements described in the embodiment are not necessarily indispensable for solving means of the invention.

In the following description, there is a case where information that is able to obtain an output with respect to an input is described in expressions such as "xxx table" or "xxx list", but this type of information may be data of certain structure, or may be a learning model such as a neural network that generates an output with respect to an input. Therefore, the "xxx table" or the "xxx list" is able to be referred to as "xxx information". In addition, in the following description, a configuration of each table or each list is an example, and one table or list may be divided into two or more tables or lists, or a part or all of two or more tables or lists may be one table or list.

Furthermore, although "number" is used as identification information of each items of information, it is possible to use information other than the number (for example, "name", "given name", and "ID") as the identification information instead of or in addition to the number. In the figure, the number is written as "#".

In the following description, an "interface unit" may be one or more interfaces. The one or more interfaces may be one or more of the same kinds of communication interface devices (for example, one or more network interface card (NIC)) or two or more different kinds of communication interface devices (for example, NIC and host bus adapter (HBA)).

In the following description, a "memory unit" is one or more memories, and may typically be amain storage device. At least one memory in the memory unit may be a volatile memory or a nonvolatile memory.

In the following description, a "PDEV unit" is one or more PDEVs, and may typically be an auxiliary storage device. The "PDEV" means a physical storage device, and typically is a nonvolatile storage device, for example, a hard disk drive (HDD) or a solid state drive (SSD). That is, the PDEV unit is an example of a storage device unit.

In the following description, a "storage unit" is at least one (typically, at least a memory unit) of the memory unit and the PDEV unit.

In the following description, a "processor unit" is one or more processors. The at least one processor is typically a microprocessor such as a central processing unit (CPU), but the at least one processor may be another kind of processor such as a graphics processing unit (GPU). The at least one processor may be a single core or a multi core. The at least one processor may be a processor in a broad sense such as a hardware circuit (for example, a field-programmable gate array (FPGA) or an application specific integrated circuit (ASIC)) that performs a part or all of a process.

In the following description, there is a case where a process is described with a "program" as a subject, however, since the program is executed by the processor unit, and thus a specified process is appropriately executed using the storage unit, the interface unit, and/or the like, the subject of the process may be a processor unit (ora device such as a controller having the processor unit thereof). The program may be installed from a program source into a device such as a computer. The program source may be, for example, a program distribution server or a recording (for example, non-transitory) medium readable by a computer. In the following description, two or more programs may be realized as one program, or one program may be realized as two or more programs.

In the following description, a "host system" is one or more host computers. The at least one host computer may be a virtual computer executed on a physical computer.

In the following description, a "management system" is one or more management computers. The at least one management computer may be a virtual computer executed on a physical computer. In addition, the management system may include a management computer as an input and output console (for example, a management computer as a client).

In the following description, a "storage system" is a system including a plurality of storage devices. The "storage device" may be a storage device such as a so-called disk array device having a plurality of PDEVs, but instead of this, a general purpose computer (for example, a software defined device that is realized by installing and executing software for exhibiting a storage function, such as software-defined storage (SDS) or software-defined datacenter (SDDC)). In addition, at least one storage device may have a function as at least a part of the host system, in addition to the function as the storage device.

In the following description, a "data set" is a piece of logical electronic data as seen from a program such as an application program, and, for example, may be one of a record, a file, a key value pair, and a tuple.

In the following description, a "RAID" is an abbreviation of redundant array of inexpensive disks. A RAID group is configured of a plurality of PDEVs (typically, the same kind of PDEV), and stores data according to a RAID level associated with the RAID group. The RAID group may be referred to as a parity group. The parity group may be, for example, the RAID group that stores parity.

In the following description, a "VOL" is an abbreviation of a logical volume and may be a logical storage device. The VOL may be a substantive VOL (RVOL) or a virtual VOL (VVOL). The "RVOL" may be a VOL based on a physical storage resource (for example, one or more RAID groups) included in a storage system having the RVOL. The "VVOL" may be any one of an external connection VOL (EVOL), a capacity expansion VOL (TPVOL), and a snapshot VOL. The EVOL may be a VOL that is based on a storage space (for example, the VOL) of an external storage system and conforming to a storage virtualization technology. The TPVOL may be a VOL configured with a plurality of virtual areas (virtual storage areas) and conforming to a capacity virtualization technology (typically thin provisioning).

In the following description, a "pool" is a logical storage area (for example, a collection of a plurality of pool VOLs) and may be prepared for each use. For example, as a pool, there may be at least one kind of a TP pool and a snapshot pool. The TP pool may be a storage area configured of a plurality of pages (substantive storage areas). In a case where a page is not allocated to a virtual area (virtual area of TPVOL) to which an address specified by a write request received from the host system (hereinafter, host) belongs, a storage controller allocates a page to the virtual area thereof from the TP pool (write destination virtual area) (the page may be newly allocated to the write destination virtual area even though the page has already been allocated to the write destination virtual area). The storage controller may write target data accompanying the write request to the allocated page. The snapshot pool may be a storage area in which data evacuated from an original VOL is stored. One pool may be used as both of the TP pool and the snapshot pool. The "pool VOL" may be a VOL that is a component of the pool. The pool VOL may be the RVOL or the EVOL.

In the following description, a VOL (a VOL provided to the host) recognized from the host may be referred to as an "HDEV". In the following description, the HDEV is the TPVOL (or RVOL), and the pool is the TP pool. However, the present invention can also be applied to a storage device that is not employing the capacity expansion technology (thin provisioning).

In the following description, a "primary VOL (PVOL)" is an HDEV that is an original volume of replication and snapshot, and "secondary VOL (SVOL)" is an HDEV that is replication or snapshot destination.

In addition, in the following description, in a case where the same kind of element is described without distinguishing, a common reference numeral is used among reference numerals, and in a case where the same kind of element is described with distinguishing, a reference numeral may be used in some cases. For example, in a case where the storage device is described without particularly distinguishing, the storage device is described as a "storage device 2000", and in a case where each storage device described with distinguishing, the storage device is described, such as a "storage device 2000A", a "storage device 2000B" in some cases.

In the following description, a "replication pair" means a VOL pair for remote replication. A "synchronous pair" means a replication pair for synchronous remote replication. An "asynchronous pair" means a replication pair for asynchronous remote replication.

FIG. 1 shows the overall configuration of a system including a storage system according to an embodiment.

A storage system 500, one or more hosts 1003, and a management server 1004 are connected to a network 1008. The network 1008 is a set of one or a plurality of networks, for example, a fiber channel (FC) or an Internet small computer system interface (iSCSI).

The host 1003 is an abbreviation of a host system. The host 1003 has a host interface device (H-I/F) 2004. The host 1003 transmits an I/O request (write request or read request) to a storage device 2000 via the H-I/F 2004, or receives a response of the I/O request (for example, a write response including write completion or a read response including read target data). The H-I/F 2004 is, for example, a host bus adapter (HBA) or a network interface card (NIC).

The management server 1004 is an example of a management system and manages a configuration and a state of the storage system 500. The management server 1004 has a management interface device (M-I/F) 2003. The management server 1004 transmits an instruction to the storage device 2000 in the storage system 500 or receives a response to the instruction via the M-I/F 2003. The M-I/F 2003 is, for example, an NIC.

The storage system 500 has a plurality of storage devices 2000. An example of the plurality of storage devices 2000 is a storage device 2000A (an example of a first storage device) and a storage device 2000B (an example of a second storage device). The storage device 2000 has a plurality of PDEVs 2009 and a storage controller 630 connected to the plurality of PDEVs 2009. One or more RAID groups including the plurality of PDEVs 2009 may be configured.

The storage controller 630 has a front-end interface device (F-I/F) 214, a back end interface device (B-I/F) 2006, a cache memory (CM) 2014, an non-volatile RAM (NVRAM) 2013, an MPPK 2100 (for example, duplexed MPPKs 2100A and 2100B), and a repeater 2007 that relays communication between those elements. The repeater 2007 is, for example, a bus or a switch. The MPPK 2100 has a dynamic random access memory (DRAM) 2002 and a CPU 2001. The F-I/F 214 and the B-I/F 2006 are an example of the interface unit. The CM 2014, the NVRAM 2013, and the DRAM 2002 are an example of the memory unit. The CPU 2001 is an example of the processor unit.

The F-I/F 214 is an I/F that communicates with the host 1003 or the management server. The B-I/F 2006 is an I/F that communicates with the PDEV 2009.

Data written in the PDEV 2009 or data read from the PDEV 2009 is temporarily stored in the CM (for example, DRAM) 2014 by the MPPK 2100. In the NVRAM 2013, data (for example, dirty data (data that is not written in the PDEV 2009)) in the CM 2014 is evacuated by the MPPK 2100 that received power from a battery (not shown) at a time of power interruption.

A cluster is configured by the MPPKs 2100A and 2100B. The MPPK 2100A (2100B) has a DRAM 2002A (2002B) and a CPU 2001A (2001B) connected thereto. A control program 3000A (3000B) executed by the CPU 2001A (2001B) and management information 4000A (4000B) referred or updated by the CPU 2001A (2001B) are stored in the DRAM 2002A (2002B). For example, an I/O process or an address conversion process is executed by executing the control program 3000A (3000B) to the CPU 2001A (2001B). At least one of the control program 3000A (3000B) and the management information 4000A (4000B) may be stored in a shared storage area (for example, the CM 2014) in the plurality of MPPKs 2100A and 2100B.

<Outline of Asynchronous Remote Replication>

Figure 2A:
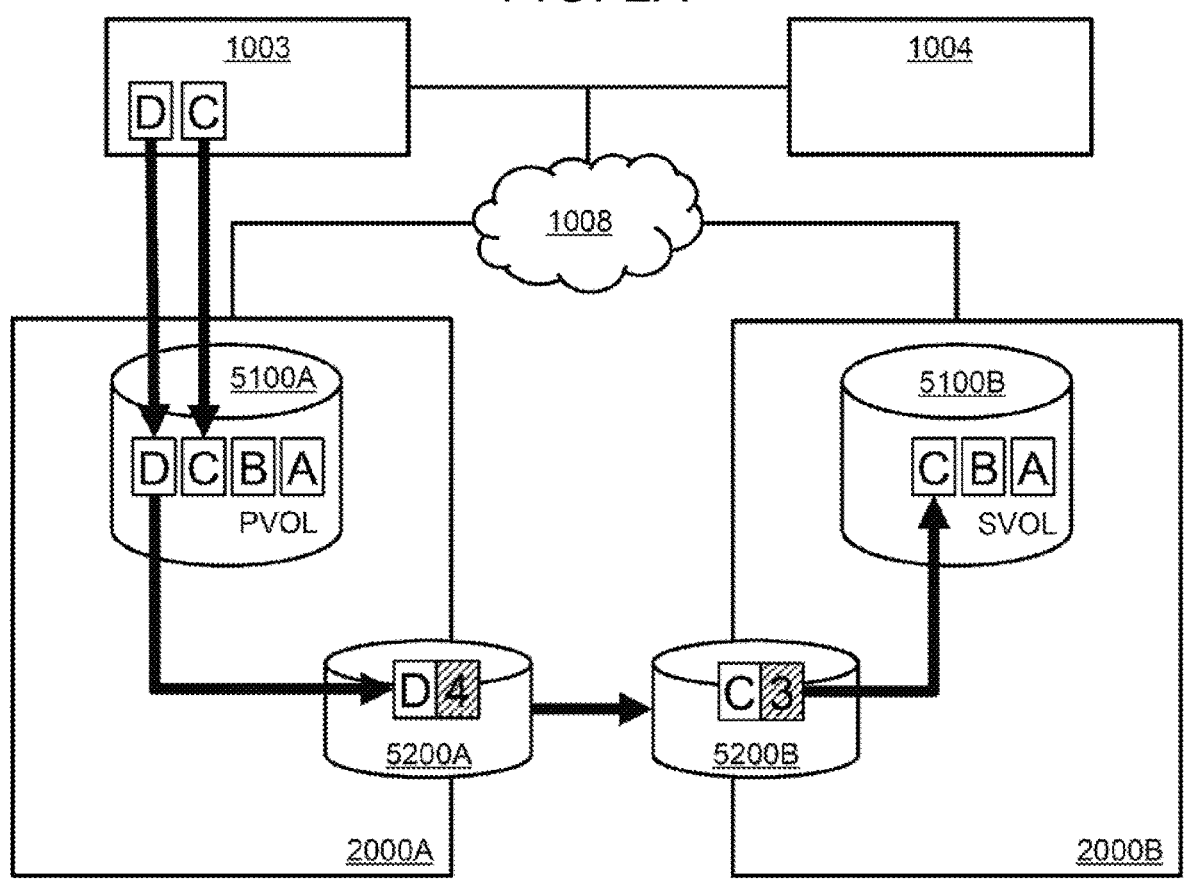
FIG. 2A shows an example of asynchronous remote replication according to the present embodiment.

FIG. 2A shows an example of asynchronous remote replication according to the present embodiment.

The storage device 2000A and the storage device 2000B are installed at respective sites via the network 1008. An asynchronous pair of a primary Vol (PVOL) 5100A of the storage device 2000A and a secondary Vol (SVOL) 5100B of the storage device 2000B is configured. At this time, a relationship between the PVOL and the SVOL does not need to be one to one correspondence, but the relationship between the PVOL and the SVOL may be a configuration in which one PVOL corresponds to a plurality of SVOLs. That is, for the same PVOL, a plurality of asynchronous pairs (or synchronous pairs) may be present.

For example, construction of the asynchronous pair from the PVOL 5100A to the SVOL 5100B is performed as follows. First, the storage system 2000A transmits all pieces of data in the PVOL 5100A to the storage system 2000B by an instruction from the management server 1004, and the storage system 2000B writes the data to the SVOL 5100B. That is, replication from the PVOL 5100A to the SVOL 5100B is performed. This replication is referred to as "forming replication". In addition, the storage device 2000A and the storage device 2000B associate the PVOL 5100A and the SVOL 5100B with each other as a pair. After update data from the host 1003A for the PVOL 5100A associated as the pair is stored in the PVOL 5100A and is replicated asynchronously to the SVOL 5100B that is a pair counterpart. This replication is referred to as "differential replication".

In the asynchronous remote replication, a journal VOL (JVOL) 5200 is used. The JVOL 5200 is a VOL to which a journal (JNL) is written and is an example of a JNL storage area. The JNL includes data (accurately, a copy of the data) written in the PVOL and metadata related to the data. The metadata includes a JNL number indicating an order (update order) of the data written in the PVOL and write destination information indicating an address of a write destination of the data. Note that unit data of I/O or unit data (for example, data of a predetermined size) included in the JNL may be an example of a data set. In addition, the JNL number may be referred to as a sequential number (SEQ number). In addition, according to the example of FIG. 2A, although the storage device 2000A has the JVOL 5200A and the storage device 2000B has the JVOL 5200B, either one of the JVOL 5200 may not be provided. The JNL number may be a serial number. In addition, the JVOL 5200 may be prepared for each PVOL or for each SVOL, or may be common to a plurality of PVOLs or a plurality of SVOLs.

In order to guarantee consistency between the PVOL 5100A and the SVOL 5100B, the storage device 2000 synchronizes the PVOL 5100A and the SVOL 5100B with the following procedure while guaranteeing the update order for the PVOL 5100A of the host 1003A.

FIG. 2A shows an example in which the storage device 2000A receives a write request for writing data "C" to the PVOL 5100A from the host 1003A and then receives a write request for writing data "D" to the PVOL 5100A. The storage device 2000A gives a JNL number "3" to the data "C" and stores a JNL including the data "C" and the JNL number "3" in the JVOL 5200A. Next, the storage device 2000A gives a JNL number "4" (the next number) to the data "D" and stores a JNL including the data "D" and the JNL number "4" in the JVOL 5200A. The storage device 2000A transmits the JNL to be transmitted (for example, a JNL that is not transmitted or a JNL requested from the storage device 2000B) among the JNLs stored in the JVOL 5200A to the storage device 2000B, and the transmitted JNL is stored in the JVOL 5200B of the storage device 2000B. The storage device 2000B reflects the JNL stored in the JVOL 5200B on the SVOL 5100B in the order of the JNL number, that is, writes the data "C" and "D" to the SVOL 5100B in the order of the data "C" and In this way, the PVOL 5100A and the SVOL 5100B perform synchronization (match) while guaranteeing the update order.

<Asynchronous Pair Copy According to Comparative Example>

Figure 2B:
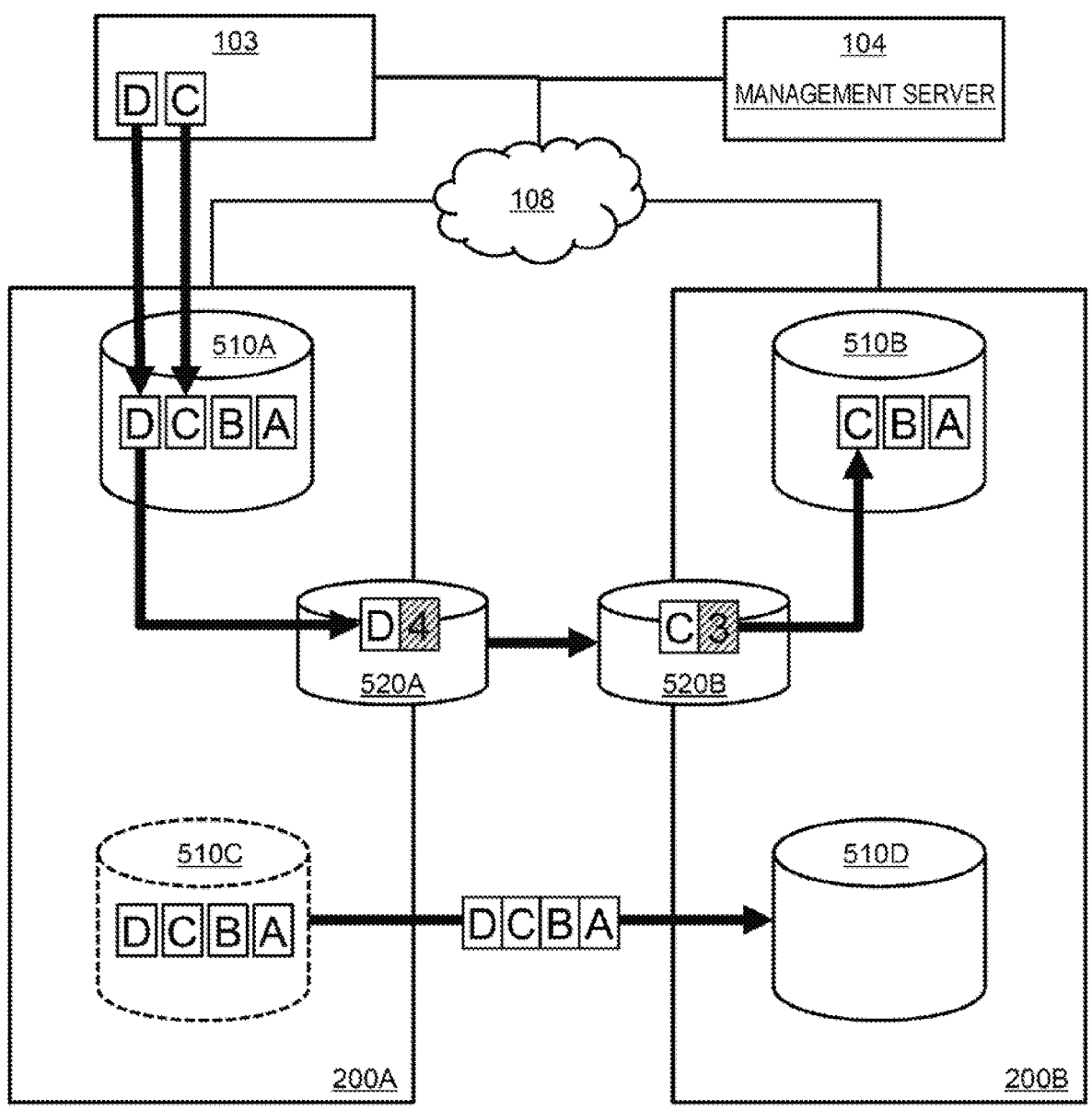
FIG. 2B schematically shows an example of an asynchronous pair copy according to one comparative example.

FIG. 2B schematically shows asynchronous pair copy according to one comparative example.

A flow of the replication of the data from the PVOL 510A to the SVOL 510B of a case where the data is written from the host 103 to the PVOL 510A is as described with reference to FIG. 2A. That is, the JNL including the data and the JNL number is written in the JVOL 520A of the storage device 200A, transferred from the JVOL 520A to the JVOL 520B of the storage device 200B, and reflected on the SVOL 510B from the JVOL 520B.

The copy of the asynchronous pair between the PVOL 510A and the SVOL 510B is performed as follows.

That is, the storage device 200A creates a copy of the PVOL 510A as a PVOL 510C by an instruction from the management server 104. The PVOL 510C may be a VOL storing the data replicated from the PVOL 510A or a VOL created as a snapshot of the PVOL 510A.

Next, the storage device 200B creates an SVOL 510D that is a pair counterpart of the PVOL 510C.

At this time, the SVOL 510B that is a pair counterpart of the PVOL 510A is present as a copy source of the PVOL 510C in the storage device 200B, but there is no pair relationship between the PVOL 510C and the SVOL 510B. At a time of creating the PVOL 510C, a synchronization between the PVOL 510C and the SVOL 510B are not guaranteed. Therefore, it is not possible use the SVOL 510B as the copy source of the SVOL 510D. Thus, the SVOL 510D needs to be created from the PVOL 510C by the forming replication. As a result, the storage device 200A needs to transmit all pieces of the data in the PVOL 510C to the storage device 200B. Therefore, in a case where a data amount of the PVOL 510C is large, an increase in a communication data amount of the network 108 or an increase in a communication time is caused, and thus a time required for creating the SVOL 510D and a pressure on a communication band become problems. In addition, since all pieces of the data in the PVOL 510C are stored in the SVOL 510D, an increase in storage capacity consumed by the storage device 200B also becomes a problem.

<Asynchronous Pair Copy According to the Present Embodiment>

Figure 2C:
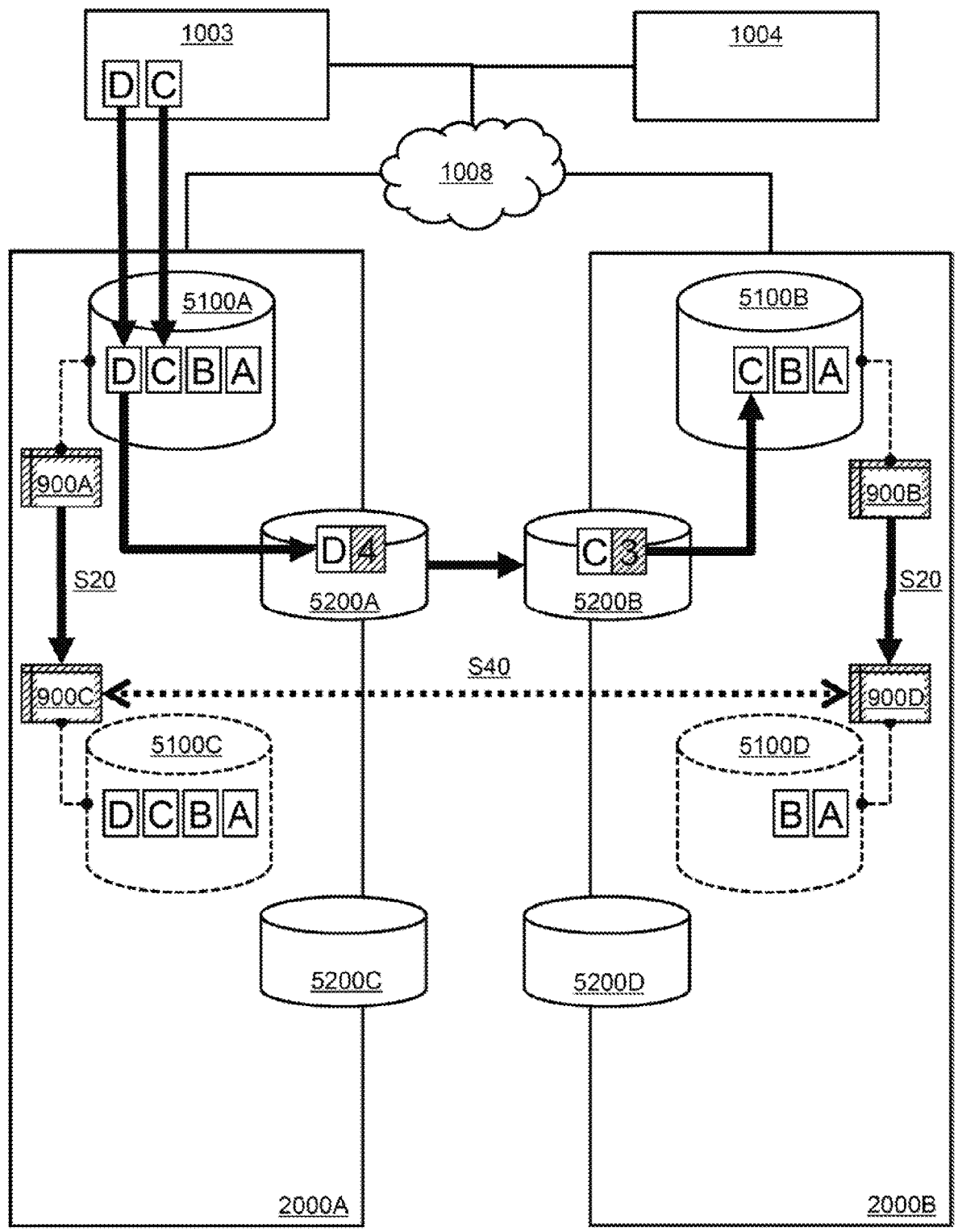
FIG. 2C schematically shows an example of the asynchronous pair copy according to the present embodiment.

FIG. 2C schematically shows asynchronous pair copy according to the present embodiment.

The storage device 2000A (control program 3000A) creates a snapshot of the PVOL 5100A (an example of the first primary volume) as the PVOL 5100C (an example of the second primary volume) by an instruction from the management server 1004. At this time, the storage device 2000A (control program 3000A) creates a copy of the logical information 900A (an example of the first primary logical information) of the PVOL 5100A as the logical information 900C (an example of the second primary logical information) of the PVOL 5100C (S20A). The logical information 900C is a copy of the logical information 900A when the PVOL 5100C is created. The logical information 900A is information including a first journal number that is a number of data recently written in the PVOL 5100A, and includes, for example, at least a part of an HDEV logical to physical table, a pair management table, and a JNL management table, which will be described later. Both of the PVOL 5100A and the PVOL 5100C are VOLs to which the data is input from the host 1003 and from which the data is output to the host 1003.

Similarly, the storage device 2000B (control program 3000B) creates a snapshot of the SVOL 5100B (an example of the first secondary volume) as the SVOL 5100D (an example of the second secondary volume) by an instruction from the management server 1004. At this time, the storage device 2000B (control program 3000B) creates a copy of the logical information 900B (an example of the first secondary logical information) of the SVOL 5100B as the logical information 900D (an example of the second secondary logical information) of the SVOL 5100D (S20B). The logical information 900D is a copy of the logical information 900B when the SVOL 5100D is created. The logical information 900B is information including a second journal number that is at least one of a number of the data recently received from the storage device 2000A with respect to the PVOL 5100A and a number of the data recently reflected on the SVOL 5100B, and includes, for example, at least a part of the HDEV logical to physical table, the pair management table, and the JNL management table, which will be described later.

At this time, since the PVOL 5100C and the SVOL 5100D are created in an arbitrary time, data consistency is not guaranteed.

Therefore, at least one of the storage device 2000A (control program 3000A) and the storage device 2000B (control program 3000B) compares the logical information 900C and the logical information 900D with each other (S40). In a case where there is a difference between the logical information 900C (for example, the first journal number) and the logical information 900D (for example, the second journal number), the data that is not reflected on the SVOL 5100D among the data in the PVOL 5100C is detected from the difference. In addition, the storage device 2000B (control program 3000B) reflects the differential data (differential JNL) that is not reflected on the SVOL 5100D, on the SVOL 5100D. In a case where all pieces of the differential data are reflected on the SVOL 5100D, the SVOL 5100D matches (synchronizes) with the PVOL 5100C, and an asynchronous pair (a copy of an asynchronous pair of the PVOL 5100A and the SVOL 5100B) between the PVOL 5100C and the SVOL 5100D is completed. However, at that time, in a case where there is data (for example, data that is present in the SVOL 5100B (or JVOL 5200B)) that is already present in the storage device 2000B in the differential data, the storage device 2000B (control program 3000B) sets the data as data that has been copied to the SVOL 5100D by causing the data to be referred to by the SVOL 5100D. Which data among the differential data that is already present in the storage device 2000B is able to be specified by comparing the logical information 900D and the latest logical information 900B with each other by the storage device 2000B (control program 3000B) (that is, from a difference between the logical information 900D and the latest logical information 900B). Specifically, in a case where there is a difference between the second journal number (a number of data recently received from a transmission side device) in the logical information 900D and the second journal number (a number of data recently received from the transmission side device) in the latest logical information 900B, the data corresponding to the difference is data that is already present in the storage device 2000B.

In this way, it is possible to create an asynchronous pair of the PVOL 5100C and the SVOL 5100D as a copy of the asynchronous pair of the PVOL 5100A and the SVOL 5100B by synchronizing the PVOL 5100C and the SVOL 5100D. In the present embodiment, since a JVOL pair is present for each asynchronous pair, a pair of a JVOL 5200C and a JVOL 5200D is prepared for the asynchronous pair of the PVOL 5100C and the SVOL 5100D. Note that one JVOL pair may be common in a plurality of asynchronous pairs.

According to the asynchronous pair copy shown in FIG. 2C, in a case where there is no difference between the PVOL 5100C and the SVOL 5100D (in a case where the PVOL 5100C and the SVOL 5100D match) when each of the PVOL 5100C and the SVOL 5100D is created, a synchronous pair of the PVOL 5100C and the SVOL 5100D is completed without transmitting data to the storage device 2000B from the storage device 2000A. Therefore, it is possible to realize an asynchronous pair copy without increasing the storage capacity consumed by the storage device 2000B without pressing the communication band.

In addition, even though there is a difference between the PVOL 5100C and the SVOL 5100D, the data transferred from the storage device 2000A to the storage device 2000B may be the maximum of the differential data of the data in the PVOL 5100C (accurately, one or more JNL corresponding to the differential data). Therefore, it is possible to realize the asynchronous pair copy in which the pressure of the communication band or the increase in the consumption storage capacity of the storage device 2000B is reduced.

Furthermore, in a case where there is data that is already present in the storage device 2000B (for example, the SVOL 5100B) among the differential data, regarding the data, it is assumed that the data is copied to the SVOL 5100D by referring to the data to the SVOL 5100D. As a result, the data is not transmitted from the storage device 2000A. Therefore, it is possible to further reduce the pressure of the communication band or the increase in the consumption storage capacity of the storage device 2000B. This is useful because remote replication in the asynchronous pair between the PVOL 5100A and the SVOL 5100B does not depend on remote replication in the asynchronous pair between the PVOL 5100C and the SVOL 5100D (independently performed). This is because at a time of creation of the SVOL 5100D, data that is not present in the storage device 2000B may be present in the storage device 2000B (SVOL 5100B (or JVOL 5200B)) when the differential data is reflected on the SVOL 5100D.

The replication pair copy described with reference to FIG. 2C is not limited to the asynchronous pair and is able to be applied to a synchronous pair. Note that, in the asynchronous remote replication, when data is written to the PVOL from the host 1003 (for example, when the data is written in a cache area (an area in the CM 2014) associated with the write destination of the PVOL), the storage device 2000A returns a response to the host 1003. In contrast, in the synchronous remote replication, when the storage device 2000A receives a response indicating that the data is written to the SVOL (for example, that the data is written to the cache area associated with the write destination of the SVOL) from the storage device 2000B, the response is returned from the storage device 2000A to the host 1003. Therefore, it is unnecessary to create the JNL in the synchronous remote replication.

Hereinafter, the present embodiment will be described in detail.

Figure 3:
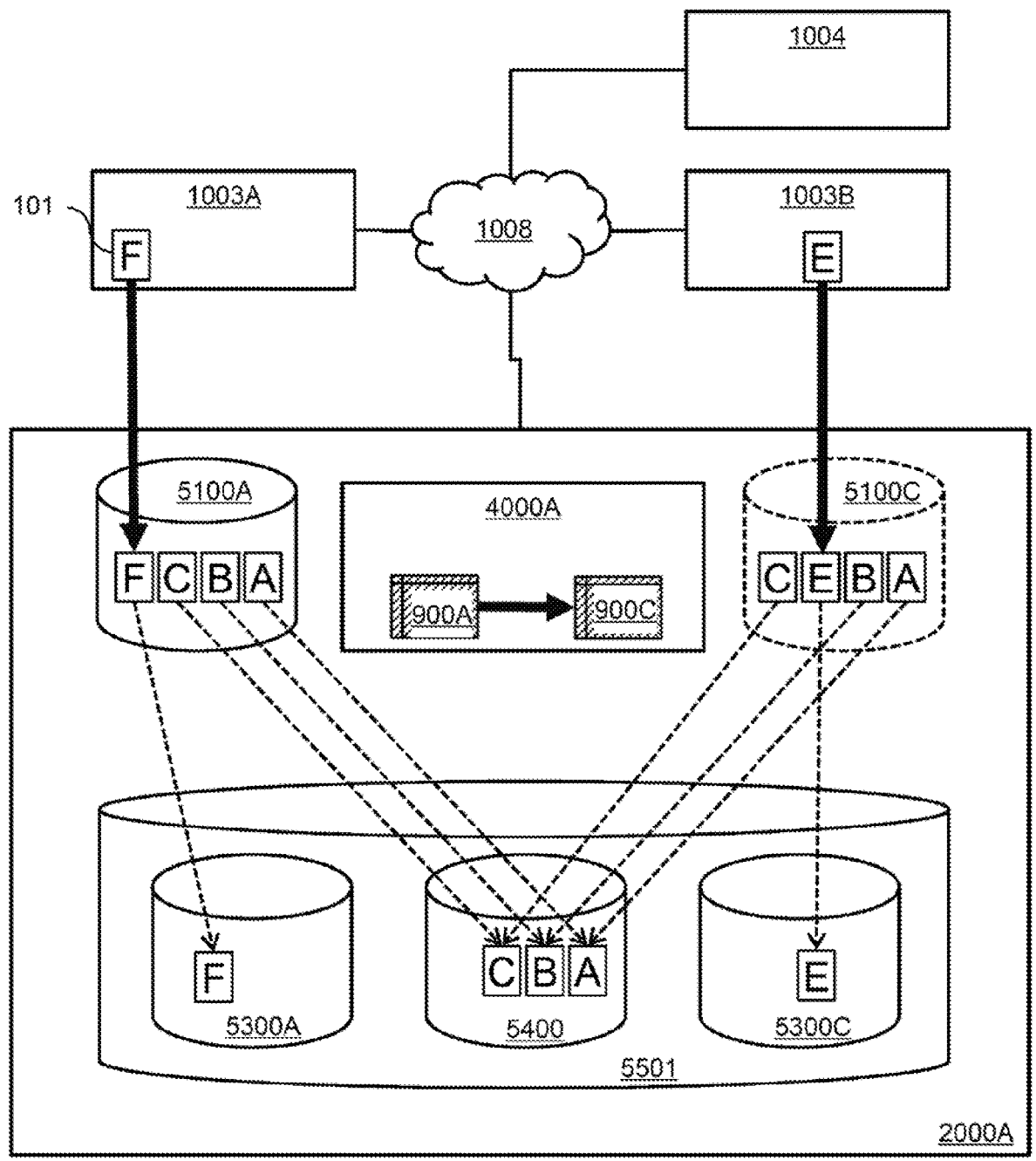
FIG. 3 schematically shows an example of a virtual copy according to an embodiment.

FIG. 3 schematically shows a virtual copy performed in the storage device 2000A. Note that the virtual copy is the same for the storage device 2000B.

In recent years, it is common that a storage function such as a duplication removal function or a snapshot function is installed as a storage function for increasing utilization efficiency of the storage device.

The duplication removal function is a function of detecting data that is duplicated between different logical addresses in the same or different volume from the data stored in the storage device, storing one piece of data as shared data, and deleting other data from the storage device for reducing consumption storage capacity (data volume). On the other hand, the snapshot function is a function of creating a snapshot at a designated time point (snapshot acquisition time point) of a certain VOL (that is, a VOL copy having the same contents as the VOL at the corresponding time point). This VOL copy (snapshot) is configured of logical information including information indicating reference to data of a copy source VOL. Therefore, a data copy from the copy source VOL is unnecessary in the storage device. Thus, it is possible to create a VOL copy at an arbitrary time point without capacity consumption of the storage device. In the virtual copy, the above-described duplication removal function or snapshot function is able to be used.

The example shown in FIG. 3 is an example in which the PVOL 5100C (HDEV) is created by virtual copying the PVOL 5100A (HDEV).

An exclusive area (for example, a pool VOL or a cache area) 5300 and a shared area 5400 (for example, a pool VOL or a cache area) are present as logical areas associated with a pool 5501. The exclusive area 5300 is present for each VOL (HDEV). One exclusive area 5300 is an area that stores data (data that is not duplicated) in which only the VOL (HDEV) corresponding to the exclusive area 5300 is set as a storage destination. On the other hand, the shared area 5400 is an area that stores data (duplicated data) in which two or more VOLs (HDEV) are set as the storage destination. In other words, an attribute is associated with the data stored in the pool 5501, and in a case where the data is data in which only one VOL (HDEV) is set as the storage destination, the attribute of the data is "exclusive possess", in a case where the data is data in which two or more VOLs (HDEVs) are set as the storage destination by creation of a snapshot or the like, the attribute of the data is "sharing". The exclusive area 5300 is an area storing data of the attribute "exclusive possess", and the shared area 5400 is an area storing data of the attribute "sharing".

It is assumed that the PVOL 5100A is associated with the exclusive area 5300A and the data "A", "B" and "C" are stored, and the virtual copy of the PVOL 5100A is performed in that state. In this case, the PVOL 5100C (the snapshot of the PVOL 5100A) and the logical information 900C (a copy of the logical information 900A at the time of snapshot acquisition of the PVOL 5100A) are created. Therefore, the data "A", "B", and "C" are also referred to by the PVOL 5100C (logical information 900C) in addition to the PVOL 5100A (logical information 900A), and as a result, attributes of the data "A", "B", and "C" change from "exclusive possess" to "sharing". Therefore, as shown in the figure, the data "A", "B", and "C" are present in the shared area 5400. That is, the data "A", "B", and "C" are not actually copied and are copied (replicated) from the PVOL 5100A to the PVOL 5100C.

Thereafter, in a case where data "F" is written to the PVOL 5100A from the host 1003A, the data "F" is stored in the exclusive area 5300A. In addition, in a case where data "E" is written to the PVOL 5100C from the host 1003B, the data "E" is stored in an exclusive area 5300C associated with the PVOL 5100C.

As described above, it is expected that deletion of the VOL (HDEV) is able to be efficiently performed by distinguishing the data storage destination between the exclusive area 5300 and the shared area 5400. For example, in a case where the PVOL 5100C is deleted, the data of the attribute "exclusive possess" may be deleted in relation to the PVOL 5100C, but since the data of the attribute "sharing" is referred to by another VOL (HDEV), the data of the attribute "sharing" is required not to be deleted. Therefore, in the deletion of the PVOL 5100C, it is possible to delete only the data in the exclusive area 5300C among the data in the PVOL 5100C. This is effective in a case where creation and deletion of the VOL (HDEV) (specially snapshot) are frequently performed for testing and the like (specifically, a case where copy and deletion of the replication pair are frequently performed).

Note that, as described above, the virtual copy of the example in FIG. 3 is also performed for the storage device 2000B. That is, as an area associated with the pool, the storage device 2000B may have an exclusive area associated with the SVOL 5100B, another exclusive area associated with the SVOL 5100D, and a shared area to which data referred to by both of the SVOL 5100B and 5100D is stored. In addition, in a case where the copy of the asynchronous pair (the asynchronous pair of the PVOL 5100C and SVOL 5100D) is deleted, in addition to the deletion of the copy, data of the attribute "exclusive possess" with respect to the PVOL 5100C and data of the attribute "exclusive possess" with respect to the SVOL 5100D may be deleted. That is, the storage device 2000A deletes the data of which the attribute is "exclusive possess" with respect to the PVOL 5100C among the data in which the PVOL 5100C is set as the storage destination, and similarly, the storage device 2000B deletes the data of which the attribute is "exclusive possess" with respect to the SVOL 5100D among the data in which the SVOL 5100D is set as the storage destination.

In addition, in the present invention, regarding the pool 5501, it is not necessary to distinguish the exclusive area 5300 and the shared area 5400.

Figure 4:
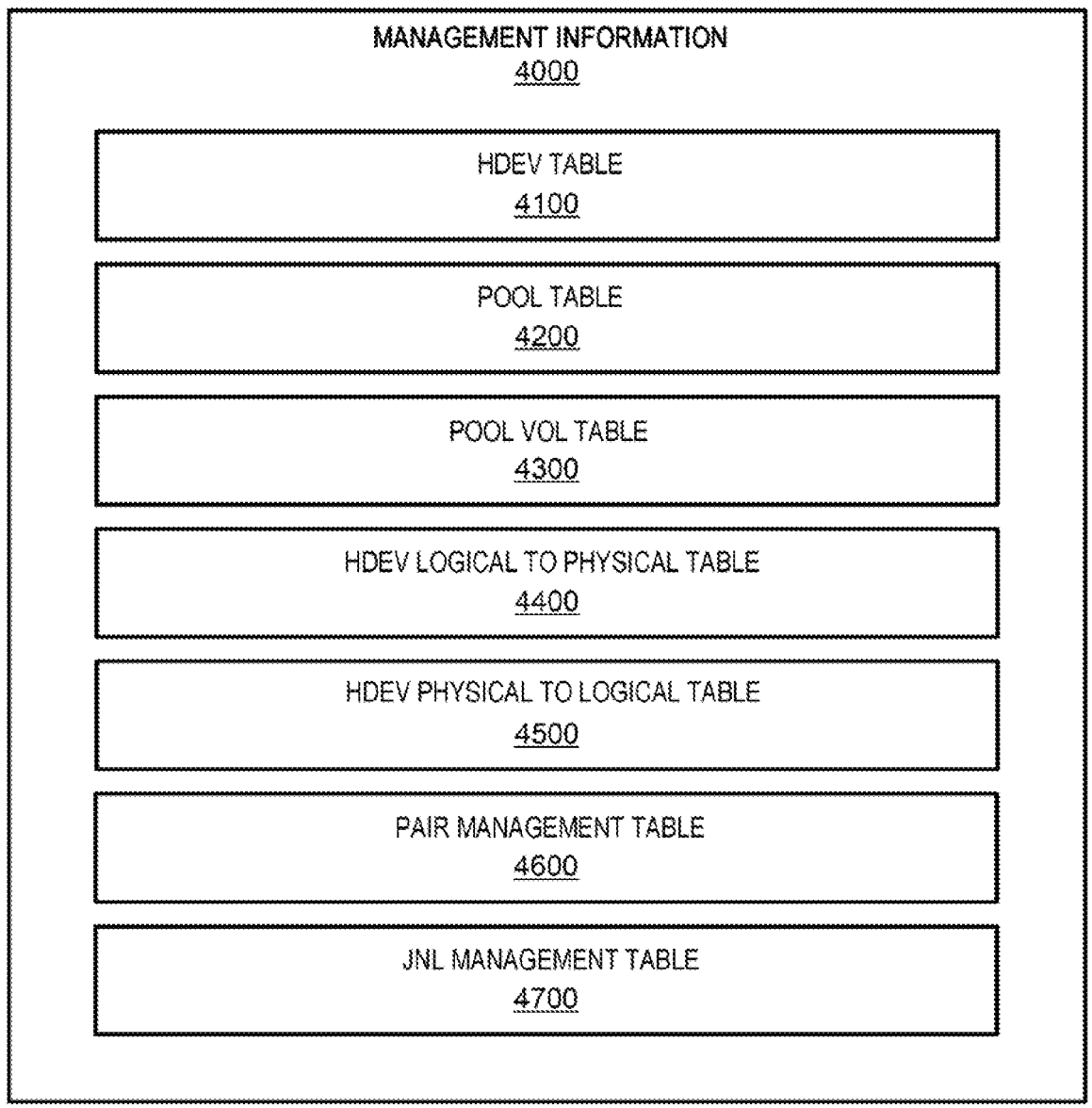
FIG. 4 shows an example of a configuration of management information.

FIG. 4 shows a configuration of management information 4000.

The management information 4000 includes a plurality of management tables. For example, as the management table, there are an HDEV table 4100 for holding information on the HDEV 5100, a pool table 4200 for holding information on the pool 5501, a pool VOL table 4300 for holding information on the pool VOL 5201, an HDEV logical to physical table 4400 for a logical to physical conversion of the HDEV, an HDEV physical to logical table 4500 for a physical to logical conversion of the HDEV, a pair management table 4600 for holding information on the replication pair, and a JNL management table 4700 for holding information on the JNL. At least part of the information may be synchronized between the management information 4000A and 4000B.

FIG. 5 shows a configuration of the HDEV table 4100.

The HDEV table 4100 has entries (records) for each HDEV 5100. Each entry stores information such as an HDEV number 4101, a capacity 4102, a VOL type 4103, and a pool number 4104.

The HDEV number 4101 represents an identification number of the HDEV 5100. The capacity 4102 represents a capacity of the HDEV 5100. The VOL type 4103 represents a type (for example, "RVOL" or "TPVOL") of the HDEV. The pool number 4104 represents an identification number of the pool 5501 to which the HDEV 5100 is associated. A data storage area (page) is allocated to the HDEV 5100 from an area within the pool 5501 to which the HDEV 5100 is associated.

FIG. 6 shows a configuration of the pool table 4200.

The pool table 4200 has an entry for each pool 5501. Each entry stores information such as a pool number 4201, a pool capacity 4202, a pool allocation capacity 4203, and a pool use capacity 4204.

The pool number 4201 represents an identification number of the pool 5501. The pool capacity 4202 represents a defined capacity of the pool 5501 (specifically, a sum of one or more VOL capacities respectively corresponding to one or more pool VOLs configuring the pool 5501). The pool allocation capacity 4203 represents an actual capacity allocated to one or more HDEVs 5100 (specifically, a capacity of the entire page group allocated to the one or more HDEVs 5100). The pool use capacity 4204 represents a total amount of data stored in the pool 5501. In a case where data reduction (at least one of compression and duplication removal) is performed on the data, the pool use capacity 4204 may be calculated by the MPPK 2100 based on the data amount after the data reduction. Note that, in a case where the data compression is performed by the PDEV 2009, the MPPK 2100 may calculate the pool used capacity 4204 based on the data amount before the compression, or may receive a notification of the data amount after the compression from the PDEV 2009 and calculate the pool use capacity 4204 based on the data amount after the compression.

Figure 7:
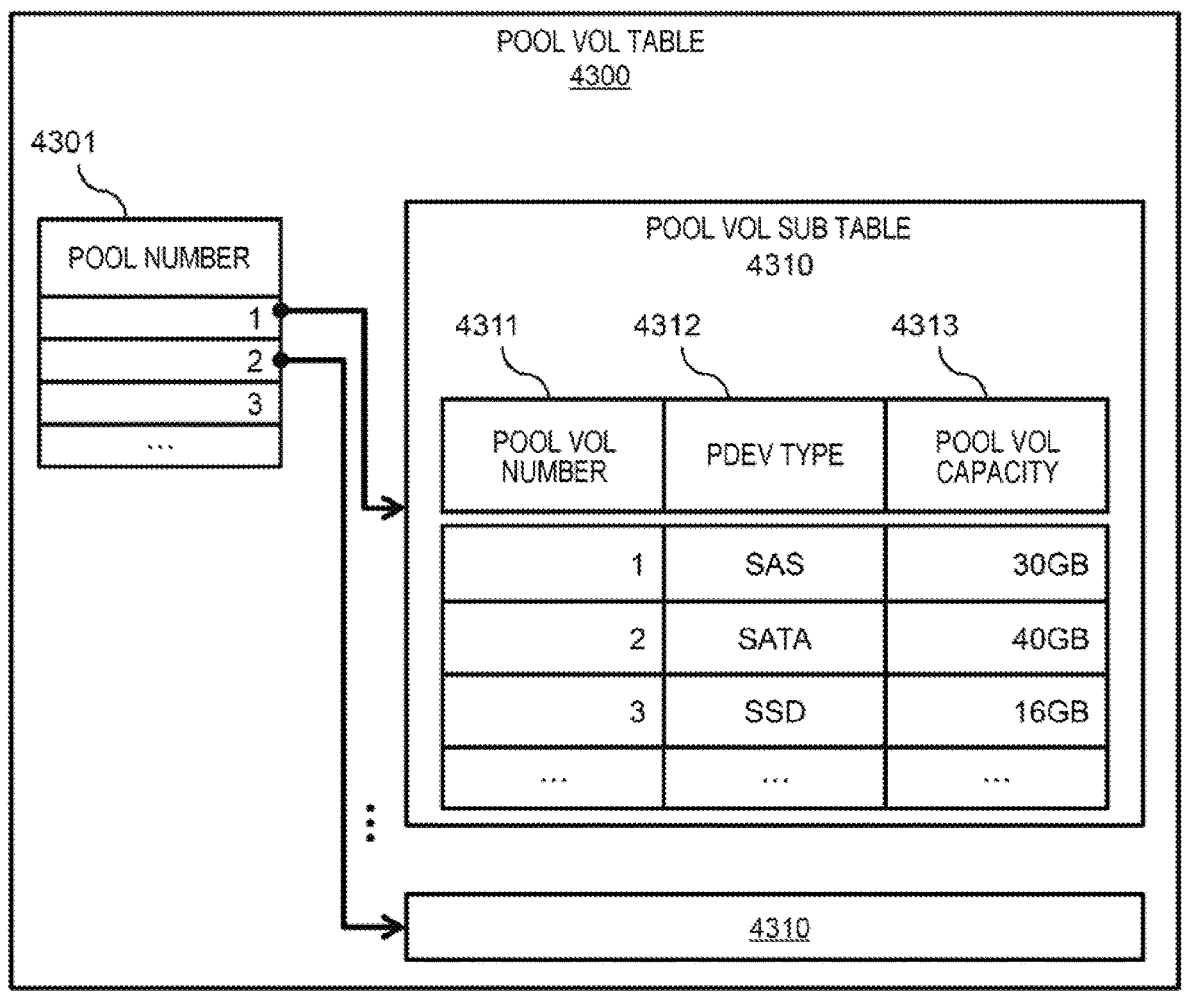
FIG. 7 shows an example of a configuration of a pool VOL table.

FIG. 7 shows a configuration of the pool VOL table 4300.

The pool VOL table 4300 has a pool VOL sub table 4310 for each pool number 4301. The pool VOL sub table 4310 has an entry for each pool VOL in the pool 5501. Each entry stores information such as a pool VOL number 4311, a PDEV type 4312, and a pool VOL capacity 4313.

The pool VOL number 4311 represents an identification number of the pool VOL. The PDEV type 4312 represents a type of the PDEV 2009 that is a basic of the pool VOL. The pool VOL capacity 4313 represents a capacity of the pool VOL.

Figure 8:
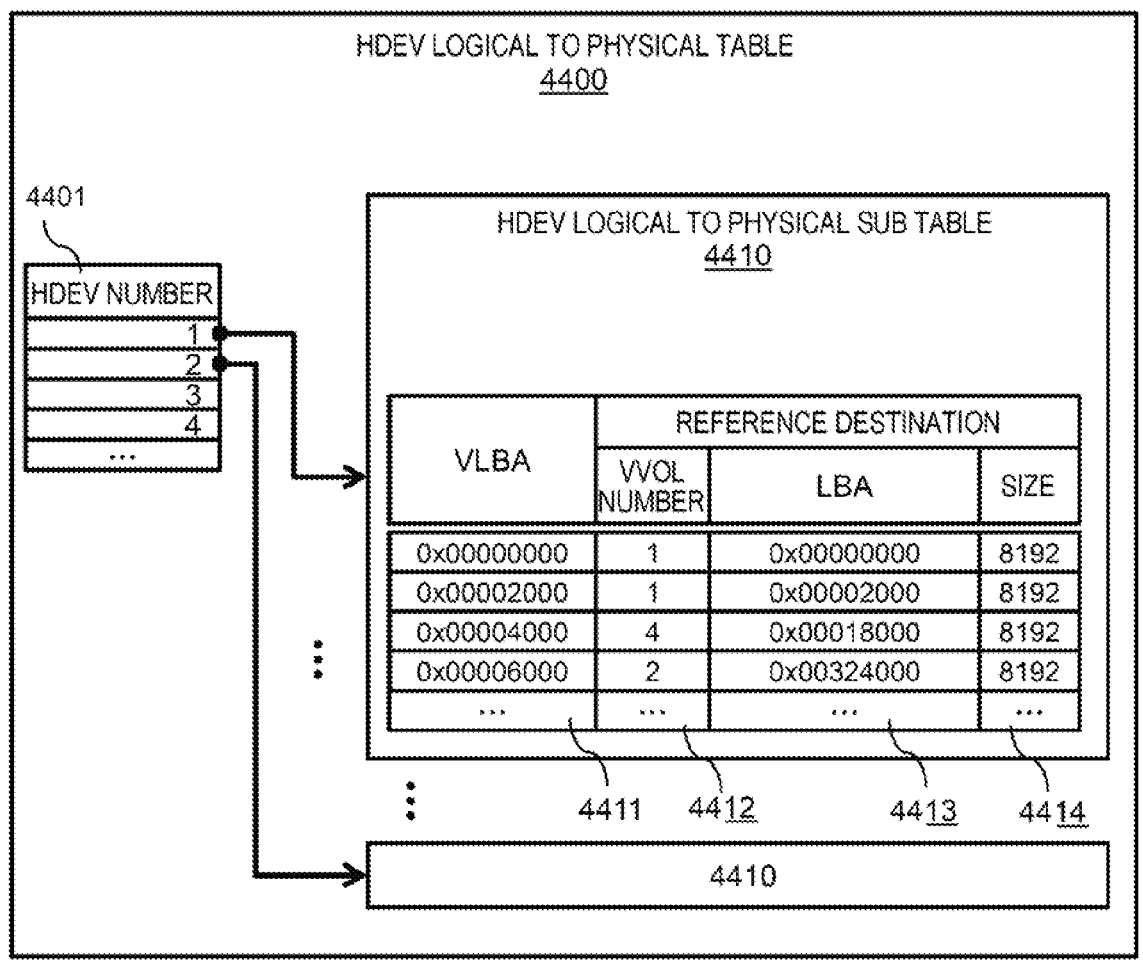
FIG. 8 shows an example of a configuration of an HDEV logical to physical table.

FIG. 8 shows a configuration of the HDEV logical to physical table 4400. In the following description, an LBA in the HDEV 5100 is referred to as a "virtual LBA". In the figure, the virtual LBA is denoted as "VLBA".

The HDEV logical to physical table 4400 is a table referred to (for a logical to physical conversion) in order to convert a logical address (logical block address: LBA) belonging to the HDEV 5100 into an LBA in the pool 5501 associated with the HDEV 5100. The HDEV logical to physical table 4400 has an HDEV logical to physical sub table 4410 for each HDEV number 4401. Each entry of the HDEV logical to physical sub table 4410 is a virtual LBA 4411, a pool VOL number 4412, an LBA 4413, and a size 4414.

The HDEV number 4401 represents an identification number of the HDEV 5100. The virtual LBA 4411 represents an LBA in the HDEV 5100. The pool VOL number 4412 represents an identification number of the pool VOL having the LBA associated with the virtual LBA. The LBA 4413 represents the LBA (an LBA in the pool VOL and a head LBA of a data storage position after the logical to physical conversion) associated with the virtual LBA. The size 4414 represents a size of data acquired from the LBA after the logical to physical conversion.

Figure 9:
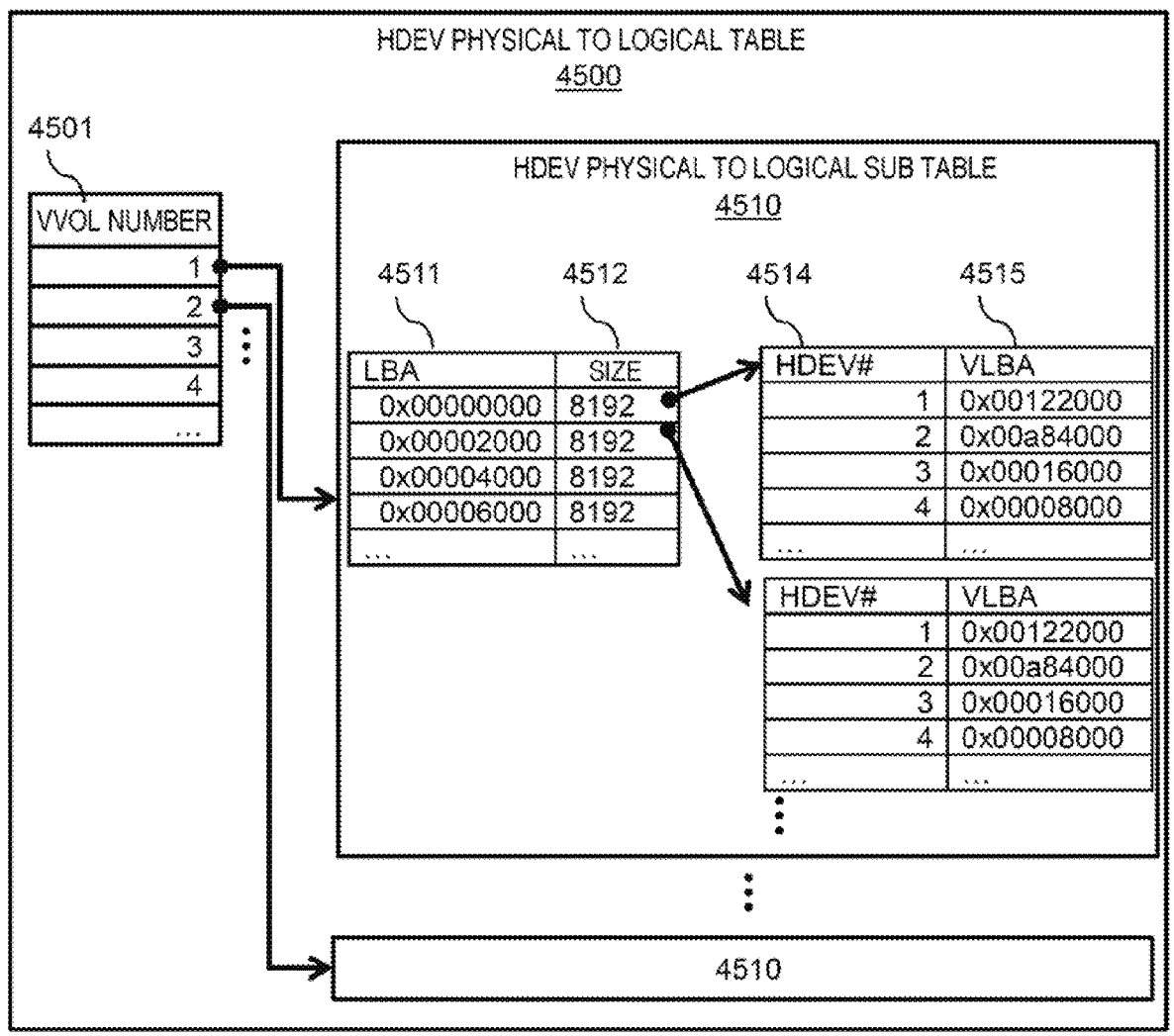
FIG. 9 shows an example of a configuration of an HDEV physical to logical table.

FIG. 9 shows a configuration of the HDEV physical to logical table 4500.

The HDEV physical to logical table 4500 is a table referred to (for a physical to logical conversion) in order to convert the LBA in the pool VOL into the virtual LBA. The HDEV physical to logical table 4500 has an HDEV physical to logical sub table 4510 for each pool VOL number 4501. The HDEV physical to logical sub table 4510 has a first list (a list of an entry storing the LBA 4511 and the size 4512), and a second list (a list of an entry storing the HDEV number 4514 and the LBA 4515) for each LBA 4511. In the second list, for example, in an LBA that stores data shared with other areas, a corresponding plurality of HDEV numbers and virtual LBAs are associated with each other. On the other hand, in an LBA that stores data that is not shared with other areas, one corresponding HDEV number and a virtual LBA are associated with each other. Instead of or in addition to holding such a list, for example, the above-described data attribute ("exclusive possess" or "sharing") may be managed for each virtual LBA.

FIG. 10 shows a configuration of the pair management table 4600.

The pair management table 4600 has an entry for each replication pair. Each entry stores information such as an R pair number 4601, a J pair number 4602, a PVOL number 4603, a pair device ID 4604, an SVOL number 4605, a synchronization method 4606, and a pair state 4607.

The R pair number 4601 represents an identification number of the replication pair. The J pair number 4602 represents an identification number of the JVOL pair (a pair of the JVOL 5200 in the storage device 2000A and the JVOL in the storage device 2000B) used for the replication pair.

The PVOL number 4602 represents an HDEV number of the PVOL (HDEV) in the replication pair.

The Pair device ID 4604 represents an ID for identifying the storage device to which the SVOL that is the pair counterpart of the PVOL is belonged. The SVOL number 4606 represents an HDEV number of the SVOL (HDEV).

The synchronization method 4606 represents a kind of remote replication in the replication pair. The synchronization method 4606 of the replication pair adopting the synchronous remote replication is "SYNC". On the other hand, the synchronous method 4606 of the replication pair adopting the asynchronous remote replication is "ASYNC".

The pair state 4607 represents a state of the replication pair. For example, in a case where the PVOL is synchronized (matched) with the SVOL, the pair state 4607 is "PAIR". In addition, for example, in a case where the PVOL is not synchronized (matched) with the SVOL, the pair state 4607 is "PSUS".

FIG. 11 shows a configuration of the JNL management table 4700.

The JNL management table 4700 has an entry for each JVOL pair. Each entry stores information such as a J pair number 4701, a source JVOL number 4702, a pair device ID 4703, a target JVOL number 4704, a latest JNL number 4705, and a reflection JNL number 4706.

The J pair number 4701 represents an identification number of the JVOL pair. The transmission JVOL number 4703 represents an identification number of a transmission side JVOL among the JVOL pairs. The pair device ID 4703 represents an ID of the storage device 2000 having a reception side JVOL among the JVOL pairs. The target JVOL number 4704 represents an identification number of the reception side JVOL among the JVOL pairs.

The latest JNL number 4705 differs depending on whether the transmission side device (the storage device having the transmission side JVOL) or the reception side device (the storage device having the reception side JVOL) has the JVL management table 4700. In the transmission side device, the latest JNL number 4705 represents the JNL number (SEQ number (write sequence number)) of the data recently stored in the transmission side JVOL. In the reception side device, the latest JNL number 4705 represents the JNL number of the data recently received from the transmission side device.

The reflection JNL number 4706 differs depending on whether the transmission side device or the reception side device has the JVL management table 4700. In the transmission side device, the reflection JNL number 4706 represents the JNL number of the data recently transmitted to the reception side device. In the reception side device, the reflection JNL number 4706 represents the JNL number of the data recently stored in the SVOL from the reception side JVOL.

As described above, in the transmission side device, the latest JNL number 4705 is an example of the first journal number, represents the JNL number of data recently stored in the transmission side JVOL (in other words, the JNL number of the data stored recently in the PVOL), and the reflection JNL number 4706 represents the JNL number of the data (JNL) recently transmitted to the reception side device. In the reception side device, the latest JNL number 4705 or the reflection JNL number 4706 is an example of the second journal number. Specifically, in the reception side device, the latest JNL number 4705 represents the JNL number of the data recently received from the transmission side device (in other words, the JNL number of the JNL recently stored in the reception side JVOL), and the reflection JNL number 4706 represents the JNL number of the data recently stored in the SVOL from the reception side JVOL.

<Copy process of Replication Pair>

Figure 12:
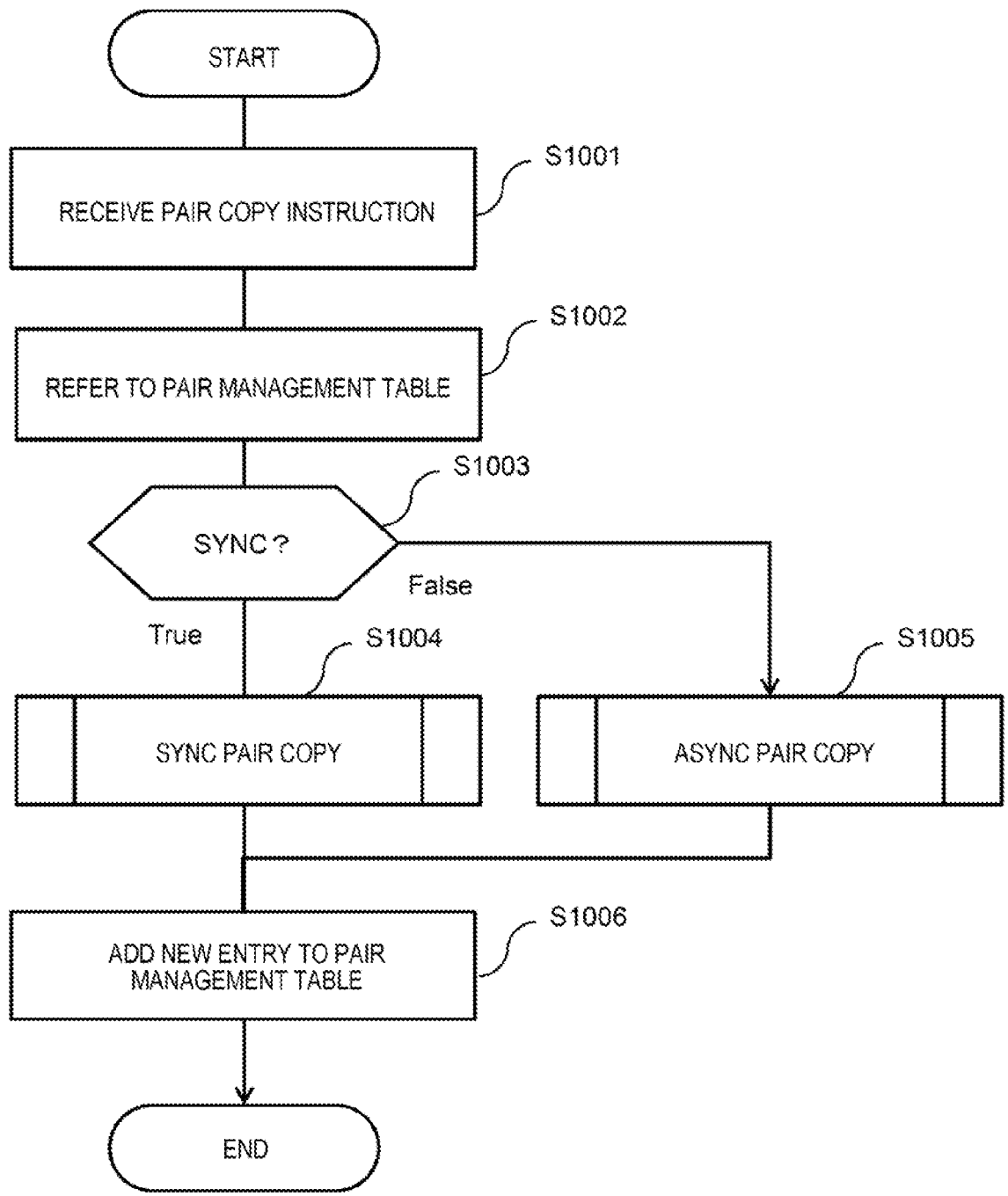
FIG. 12 shows an example of a flow of a copy process of a replication pair.

FIG. 12 shows a flow of the copy process of the replication pair. An instruction of S1001 is received by any one of the control programs 3000A and 3000B, which are predetermined programs, but in the present embodiment, it is assumed that the control program 3000A receives the instruction.

In S1001, the control program 3000A receives a pair copy instruction from the management server 1004. In S1002, the control program 3000A specifies the copy source pair (specifically, specifies the pair specified by the instruction), and refers to the information of the copy source pair from the pair management table 4600 in the management information 4000A. In S1003, the control program 3000A determines whether the synchronization method of the copy source pair is "SYNC" or "ASYNC". In a case where the synchronization method of the copy source pair is "SYNC", in S1004, the SYNC pair copy process is implemented. In a case where the synchronization method of the copy source pair is "ASYNC", in S1005, the ASYNC pair copy process is implemented. After the pair copy, in S1006, each of the control programs 3000A and 3000B newly adds information (entry) on the copy destination pair to the pair management table 4600. In the entry, the pair state 4607 is "PAIR".

Figure 13:
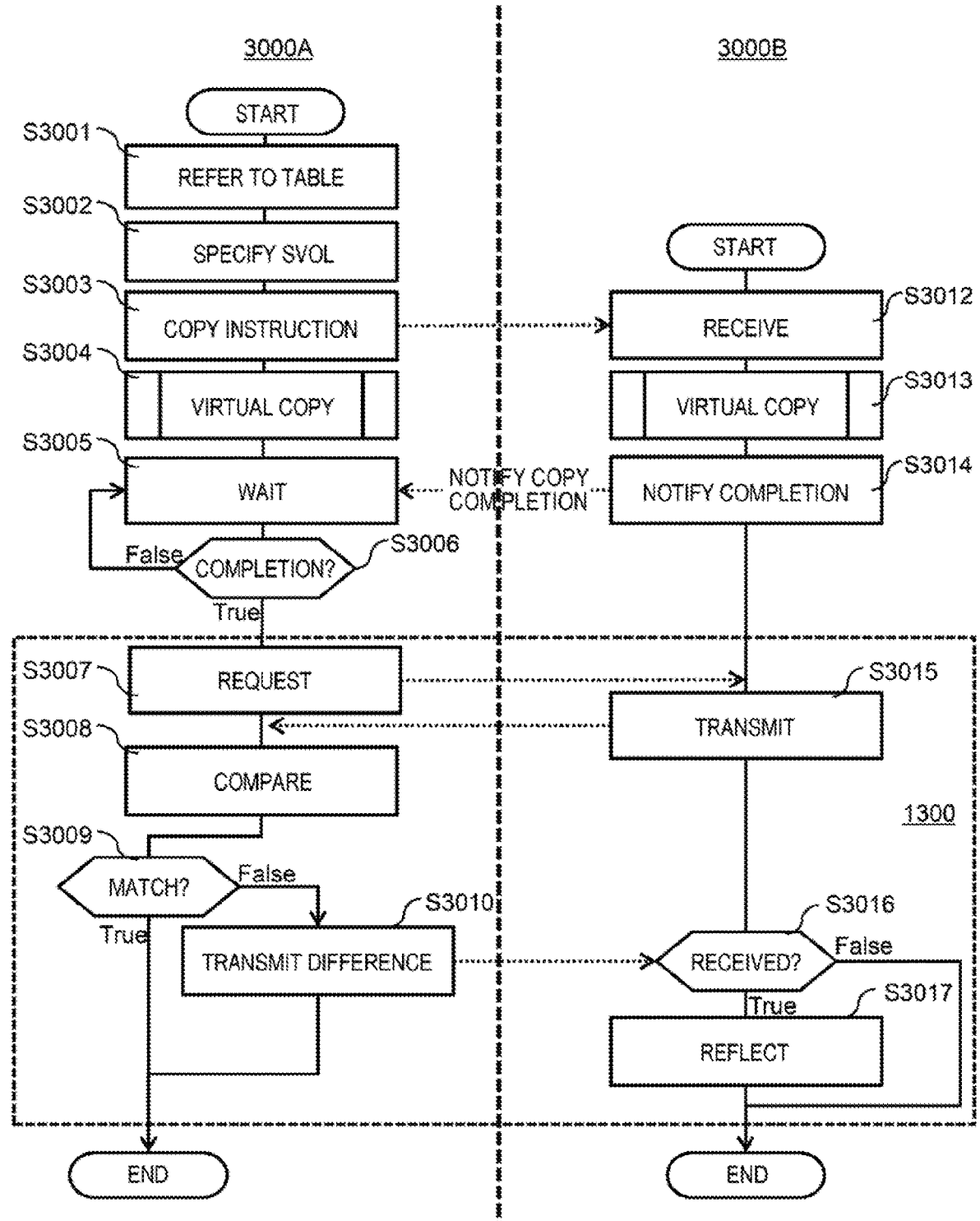
FIG. 13 shows an example of a flow of a SYNC pair copy process.

FIG. 13 shows a flow of the SYNC pair copy process. For the sake of description, it is assumed that a relationship between the VOL in the storage device 2000A and the VOL in the storage device 2000B is the relationship described with reference to FIG. 2C. That is, it is assumed that the pair of the PVOL 5100A and the SVOL 5100B is a synchronous pair.

In S3001, the control program 3000A refers to the information of the copy source pair from the pair management table 4600 in the management information 4000A. In S3002, the control program 3000A acquires the pair device ID 4601 of the copy source pair and the SVOL number 4605. In S3003, the control program 3000A transmits a copy instruction (that is, a copy instruction of the SVOL 5100B) designating the acquired pair device ID and the SVOL number to the control program 3000B. In S3012, the control program 3000B receives the copy instruction of the SVOL 5100B from the control program 3000A.

In S3004, the control program 3000A executes the virtual copy process (a creation process of the PVOL 5100C) of the PVOL 5100A (the VOL (HDEV) indicated by the PVOL number 4603 of the copy source pair). In S3013, the control program 3000B executes the virtual copy process (the creation process of the SVOL 5100C) of the SVOL 5100B in response to the copy instruction received in S3012.

In S3005, the control program 3000A waits until the virtual copy process of the control program 3000B is ended. In S3014, the control program 3000B notifies the control program 3000A of completion of the virtual copy process.

In S3006, the control program 3000A checks the completion of the process of the control program 3000B.

In S3007, the control program 3000A requests the control program 3000B for the HDEV logical to physical sub table 4410 of the SVOL 5100D created in S3013. In S3015, the control program 3000B transmits the HDEV logical to physical sub table 4410 of the SVOL 5100D to the control program 3000A in response to the request.

In S3008, the control program 3000A compares the HDEV logical to physical sub table 4410 of the PVOL 5100C created in S3004 with the HDEV logical to physical sub table 4410 from the control program 3000B. In S3009, the control program 3000A determines whether or not the PVOL 5100C and the SVOL 5100D match with each other from a result of the comparison in S3008.

In a case where a determination result of S3009 is true, the SYNC pair copy process is ended.

In a case where the determination result of S3009 is false, in S3010, the control program 3000A specifies the differential data corresponding to the difference with the SVOL 5100D among the data in the PVOL 5100C, transmits the specified differential data to the control program 3000B. In S3016, the control program 3000B receives the differential data. In S3017, the control program 3000B stores the differential data in the SVOL 5100D. As a result, the SVOL 5100D is synchronized (matched) with the PVOL 5100C.

Note that, instead the HDEV logical to physical sub table 4410 of the SVOL 5100D is transmitted from the storage device 2000B to the storage device 2000A, the HDEV logical to physical sub table 4410 of the PVOL 5100C may be transmitted from the storage device 2000A to the storage device 2000B. In addition, the comparison between the HDEV logical to physical sub tables 4410 may be performed by the control program 3000B instead of the control program 3000A.

In addition, according to an example of FIG. 13, a temporary stop of I/O of the PVOL 5100A is not performed before the virtual copy process of the PVOL 5100A (and the SVOL 5100B). That is, it is possible to cause the I/O not to be stopped. However, even though the pair of the PVOL 5100A and the SVOL 5100B is a synchronous pair, since the virtual copy process of the PVOL 5100A and the virtual copy process of the SVOL 5100B are not necessarily performed at the same timing, the PVOL 5100C and the SVOL 5100D do not always match with each other. Therefore, it is possible to guarantee that the SVOL 5100D matches with the PVOL 5100C by performing a synchronization guarantee process (S3007 to S3010, S3015 and S3016 in the example of FIG. 13) such as a dotted line frame 1300. Instead of S3007 to S3010, and S3015 and S3016, the synchronization guarantee process of the PVOL 5100C and SVOL 5100D may be performed as follows. That is, for example, a hash value indicating a data feature may be included in the HDEV logical to physical sub table 4410 for each virtual LBA. In S3009, the control program 3000A may determine whether or not the hash values are the same for each virtual LBA. In a case where there is a virtual LBA of which a result of the determination of S3009 is false, the control program 3000A may transmit the virtual LBA and a hash value corresponding to the virtual LBA (a hash value related to the PVOL 5100C) instead of the differential data. The control program 3000B specifies the virtual LBA corresponding to the same hash value as the notified hash value from the HDEV logical to physical sub table of the SVOL 5100B (the copy source of the SVOL 5100D) for the virtual LBA of the SVOL 5100D, any one of the following (x) and (y) may be performed (that is, the data that is already present in the storage device 2000B specified from the difference between the HDEV logical to physical sub tables may be reflected on the SVOL 5100D). Whichever is performed, transmission of the differential data between the storage devices 2000A and 2000B is able to be made unnecessary. In a case where (y) is performed, the copy of the data in the storage device 2000B is also able to be made unnecessary. In a case where (y) is performed, the above-described duplication removal function is a function of removing a data duplication among the same VOLs in addition to the removal of the data duplication between the VOLs. In addition, the HDEV logical to physical sub table 4410 of the PVOL 5100A is an example of the first primary logical to physical information, the HDEV logical to physical sub table 4410 of the PVOL 5100C is an example of the second primary logical to physical information, the HDEV logical to physical sub table 4410 of the SVOL 5100B is an example of the first secondary logical to physical information, and the HDEV logical to physical sub table 4410 of the SVOL 5100D is an example of the second secondary logical to physical information.

(x) A page is newly allocated to the virtual LBA of the SVOL 5100D, and the data in the page allocated to the specified virtual LBA is copied to the page.

(y) A reference destination of the virtual LBA of the SVOL 5100D is set as the page allocated to the specified virtual LBA (the information 4412 to 4414 corresponding to the virtual LBA in the HDEV logical to physical sub table of the SVOL 5100D is updated to the same information as the information 4412 to 4414 corresponding to the page allocated to the specified virtual LBA).

The I/O stop may be temporarily performed for the PVOL 5100A before the virtual copy process of the PVOL 5100A (and the SVOL 5100B). In this case, since the PVOL 5100C and SVOL 5100D match with each other, after the virtual copy process of the PVOL 5100A (and the SVOL 5100B) (before re-start of the I/O of the PVOL 5100A (before canceling the temporary stop)), the synchronization guarantee process of the PVOL 5100C and the SVOL 5100D is able to be made unnecessary.

Figure 14A:
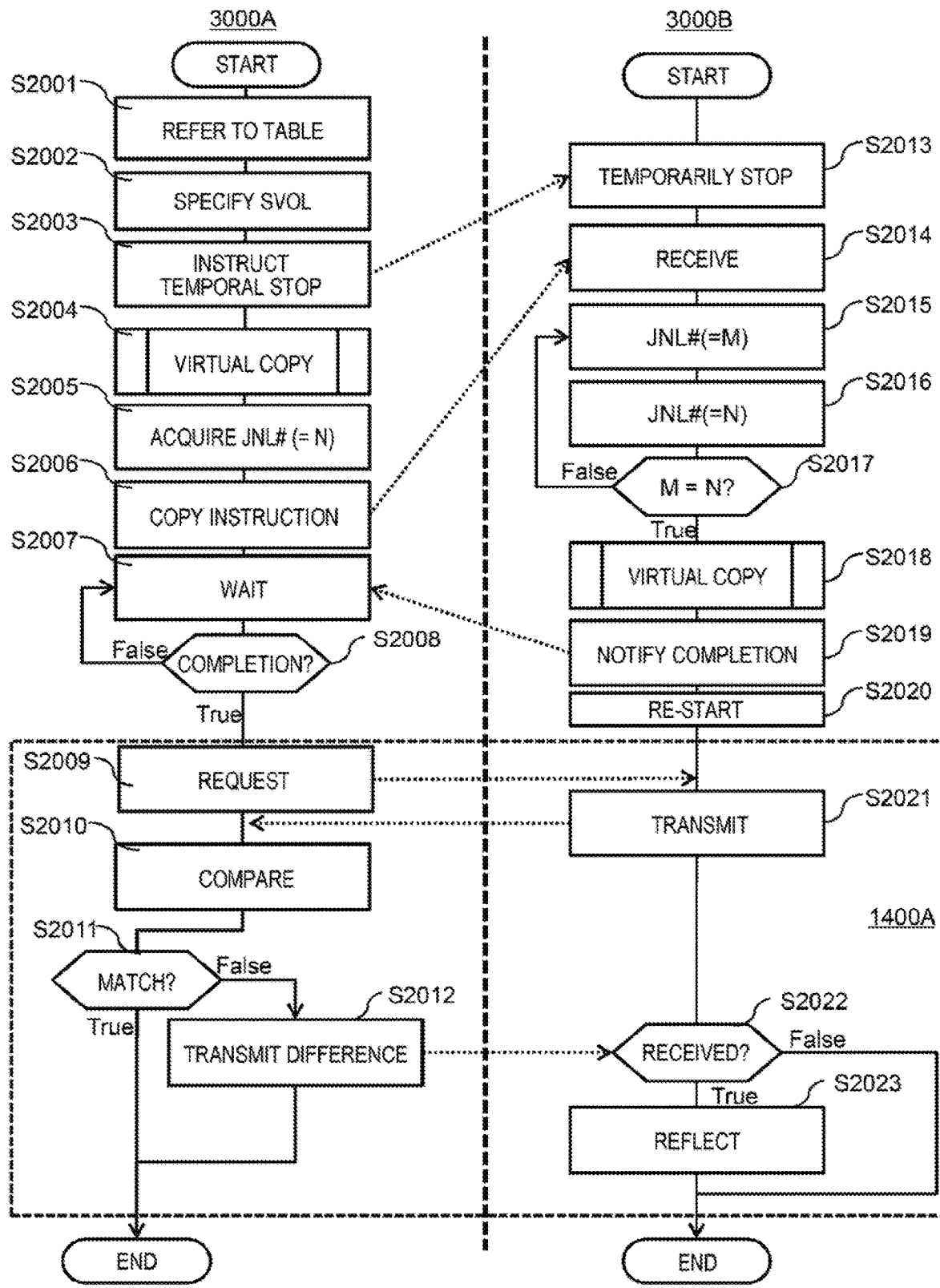
FIG. 14A shows an example of a flow of an ASYNC pair copy process.

FIG. 14A shows a flow of the ASYNC pair copy process. Also in FIG. 14A, it is assumed that the relationship between the VOL in the storage device 2000A and the VOL in the storage device 2000B is the relationship described with reference to FIG. 2C. That is, the pair of the PVOL 5100A and the SVOL 5100B is the asynchronous pair.

In S2001, the control program 3000A refers to the information of the copy source pair from the pair management table 4600 in the management information 4000A. In S2002, the control program 3000A acquires the R pair device ID 4601, the J pair number 4602, and the SVOL number 4605. In S2003, the control program 3000A transmits an instruction of the temporary stop of the reflection of the JNL on the SVOL 5100B (the SVOL indicated by the acquired SVOL number 4605) corresponding to the copy source pair, to the control program 3000B. In S2013, the control program 3000B temporarily stops reflecting the JNL on the SVOL 5100B in response to the instruction.

In S2004, the control program 3000A executes the virtual copy process (the creation process of the PVOL 5100C) of the PVOL 5100A. In S2005, the control program 3000A acquires the latest JNL number 4705 (=N) of the JVOL pair corresponding to the copy source pair from the JNL management table 4700. In S2006, the control program 3000A transmits the copy instruction (the copy instruction of the SVOL 5100B) designating the acquired pair device ID and the SVOL number, to the control program 3000B. This copy instruction includes the latest JNL number acquired in S2005. In S2014, the control program 3000B receives the copy instruction (the copy instruction of the SVOL 5100B) including the latest JNL number (=N) of the copy source pair.

In S2007, the control program 3000A waits for completion of the copy process of the SVOL 5100B of the control program 3000B. In S2015, the control program 3000B refers to the JNL management table 4700 and specifies the reflection JNL number 4706 (=M) for the JVOL pair corresponding to the copy source pair. In S2016, the control program 3000B reflects the JNL on the SVOL 5100B until the reflection JNL number 4706 (=M) matches the JNL number (=N) received in S2014 (as a result, the reflection JNL number in the logical information 900D of the SVOL 5100D is updated) as much as possible. In S2017, the control program 3000B checks that the process is ended (the reflection JNL number (=M) corresponding to the SVOL 5100B matches or is close to the JNL number (=N) as much as possible). In S2018, the control program 3000B executes the virtual copy process (the creation process of the SVOL 5100D) of the SVOL 5100B. In S2019, the control program 3000B notifies the control program 3000A of the completion of the virtual copy process.

In S2008, the control program 3000A checks the completion of the virtual copy process of the SVOL 5100B. In S2020, the control program 3000B re-starts the JNL reflection on the SVOL 5100B that is stopped in S2013.

In S2009, the control program 3000A requests the logical information 900D of the SVOL 5100D. In S2021, the control program 3000B transmits the logical information 900D of the SVOL 5100D to the control program 3000A in response to the request.

In S2010, the control program 3000A compares the logical information 900D of the SVOL 5100D with the logical information 900C of the PVOL 5100C. In S2011, the control program 3000A determines whether or not the PVOL 5100C and the SVOL 5100D match with each other (whether or not the first journal number in the logical information 900C and the second journal number (the latest JNL number or the reflection JNL number) in the logical information 900D match with each other).

In a case where the determination result of S2011 is true, the ASYNC pair copy process is ended.

In a case where the determination result of S2011 is false, in S2012, the control program 3000A specifies the differential data between the PVOL 5100C and the SVOL 5100D among the PVOLs 5100C, and transmits the differential data (one or more JNLs corresponding to the differential data) to the control program 3000B. In S2022, the control program 3000B receives the differential data, and in S2023, the control program 3000B reflects the differential data on the SVOL 5100D. As a result, the SVOL 5100D is synchronized (matched) with the PVOL 5100C. The "differential data" here is data corresponding to the difference between the latest JNL number (an example of the first journal number) of the PVOL 5100C and the reflection JNL number (an example of the second journal number) of the SVOL 5100D. In addition, a process indicated by a dotted line frame 1400A is an example of the synchronization guarantee process after the virtual copy process of each of the PVOL 5100A and the SVOL 5100B.

Figure 14B:
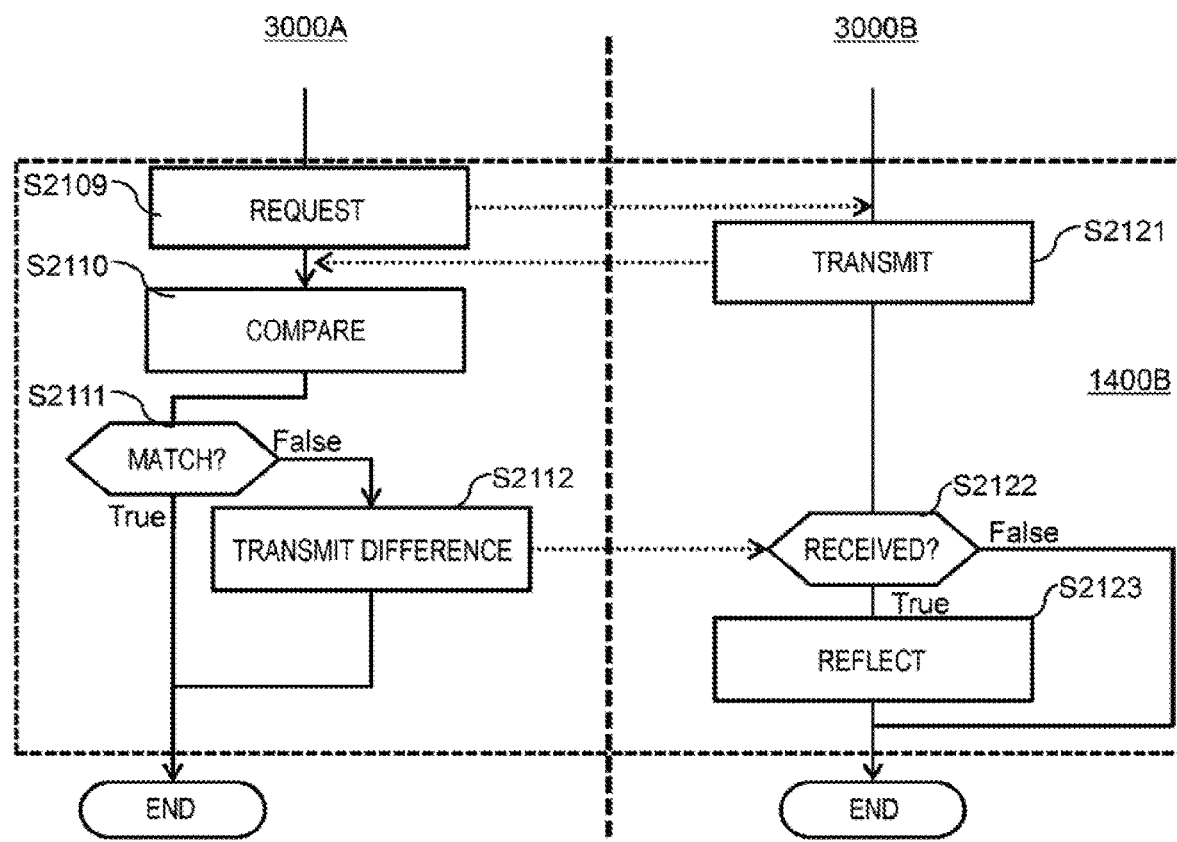
FIG. 14B shows a part including a difference from the ASYNC pair copy process shown in FIG. 14A in a modified example of the ASYNC pair copy process.

FIG. 14B shows a part including a difference from the ASYNC pair copy process shown in FIG. 14A in a modified example of the ASYNC pair copy process.

According to the flow shown in FIG. 14A, all pieces of the differential data is transmitted from the storage device 2000A to the storage device 2000B. However, according to the present modified example, it is not necessary to transmit existing data that is the data already present in the storage device 2000B from the storage device 2000A to the storage device 2000B among the differential data. Since the JNL reflection is re-started in S2020 (or since the I/O for the PVOL 5100A is not stopped and the JNL between the storage devices 2000A and 2000B is still in progress), the existing data as described above may occur.

Specifically, for example, instead of the synchronization guarantee process exemplified in FIG. 14A, a synchronization guarantee process indicated by a dotted line frame 1400B is performed.

In S2109, the control program 3000A requests the control program 3000B for the latest logical information 900B of the SVOL 5100B in addition to the logical information 900D of the SVOL 5100D. In S2121, the control program 3000B transmits the logical information 900D of the SVOL 5100D and the latest logical information 900B of the SVOL 5100B to the control program 3000A in response to the request.

In S2110, the control program 3000A compares the logical information 900D with the latest logical information 900B in addition to the comparison between the logical information 900C and the logical information 900D. In S2111, the control program 3000A determines whether or not the SVOL 5100D and the SVOL 5100B match with each other, in addition to whether or not the PVOL 5100C and the SVOL 5100D match with each other.

In S2111, in a case where the PVOL 5100C and the SVOL 5100D do not match with each other and the SVOL 5100D (logical information 900D) and the latest SVOL 5100B (latest logical information 900B) also do not match with each other, in S2112, the control program 3000A performs at least one of the following processes.

Among the differential data between the PVOL 5100C and the SVOL 5100D, for the existing data (the data that is already present in the storage device 2000B) corresponding to the difference between the logical information 900D (for example, the reflection JNL number) and the latest logical information 900B (for example, the latest JNL number (or the reflection JNL number) corresponding to the latest SVOL 5100B), the virtual LBA of the SVOL 5100D (the virtual LBA corresponding to the data that is already present) and the LBA of the page storing the data that is already present are notified to the control program 3000B.

For data other than the existing data among the differential data between the SVOL 5100D and the PVOL 5100C is transmitted to the control program 3000B similarly to S2012.

In S2122, the control program 3000B receives at least one of at least part of the differential data and a notification including the virtual LBA and the reference destination LBA of the virtual LBA. In S2123, the control program 3000B performs at least one of the following processes.

For the at least one of the at least part of the differential data, data corresponding to the at least part is reflected on the SVOL 2100D.

For the notification including the virtual LBA and the reference destination LBA of the virtual LBA, the reference destination of the virtual LBA of the SVOL 2100D is set as the LBA, on the basis of the notification (the LBA corresponding to the page storing the existing data is associated with the virtual LBA in the HDEV logical to physical sub table 4410 of the SVOL 2100D).

Note that, instead of transmitting the logical information 900D (and 900B) from the storage device 2000B to the storage device 2000A, the logical information 900C of the PVOL 5100C may be transmitted from the storage device 2000A to the storage device 2000B. In addition, the comparison between the logical information 900C and the logical information 900D (and the comparison between the logical information 900D and the latest logical information 900B) may be performed by the control program 3000B instead of the control program 3000A.

In addition, S2015 to S2017 may be performed after the virtual copy process of the SVOL 5100B (for example, in the synchronization guarantee process) instead of before the virtual copy process of the SVOL 5100B.

Figure 15:
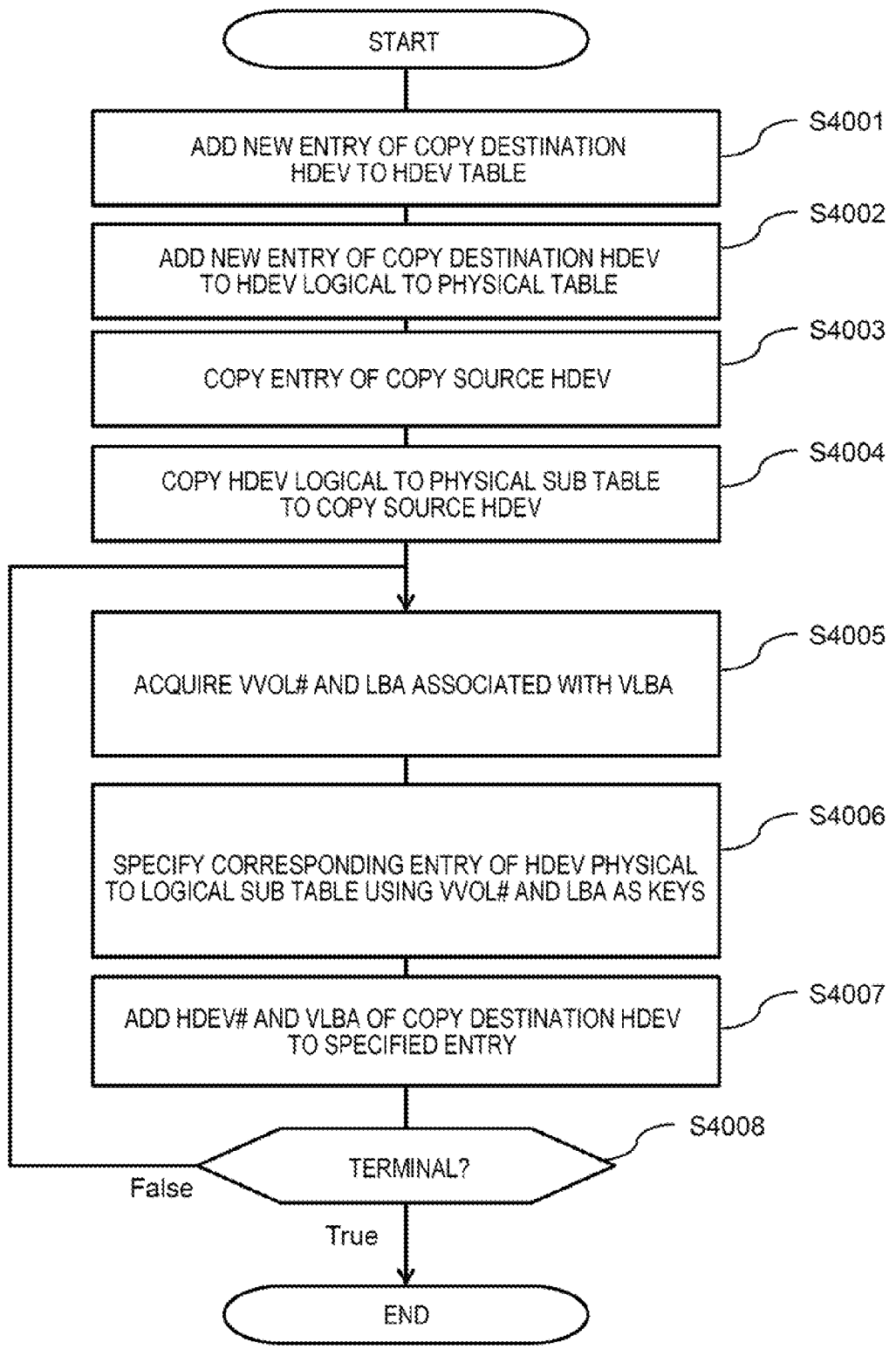
FIG. 15 shows an example of a flow of a virtual copy process.

FIG. 15 shows a flow of the virtual copy process. The description of FIG. 15 is the same for both of the storage devices 2000A and 2000B. In the description of FIG. 15, a "target program" means one of the control programs 3000A and 3000B, a "copy source HDEV" means the PVOL 5100A or the SVOL 5100B, and a "copy destination HDEV" means the PVOL 5100C or the SVOL 5100D.

In S4001, in order to create a new entry corresponding to the copy destination HDEV in the HDEV table 4100, the target program newly numbers an HDEV number 4101 (the HDEV number of the copy destination HDEV) and adds the new entry.

In S4002, in order to create a new entry corresponding to the copy destination HDEV in the HDEV logical to physical table 4400, the target program adds the new entry in which the HDEV number acquired in S4001 is set as an HDEV number 4401.

In S4003, the target program copies a capacity 4102, a VOL type 4103, and a pool number 4104 corresponding to the copy source HDEV to the entry added in S4001.

In S4004, the target program copies an HDEV logical to physical sub table 4410 corresponding to the copy source HDEV to the entry added in S4002, and associates the copied sub table 4410 with the entry added in S4002.

In S4005, the target program refers to the HDEV logical to physical sub table 4410 associated in S4004, and acquires a VVOL number 4412 and an LBA 4413 for each virtual LBA 4411.

In S4006, for each virtual LBA 4411 of the copy destination HDEV, the target program refers to an HDEV physical to logical table 4500 using the VVOL number and the LBA obtained in S4005 as keys, and specifies the corresponding entry in the HDEV physical to logical sub table 4510 (an entry matching the key).

In S4007, the target program adds the HDEV number and the virtual LBA of the copy destination HDEV obtained in S4005 to the entry (the entry in the HDEV physical to logical sub table 4510) specified in S4006. Therefore, the same virtual LBA related to the copy destination VOL is associated with the page in the pool 5501 in addition to the virtual LBA related to the copy source VOL.

In S4008, in a case where the processes up to a terminal virtual LBA of the copy destination HDEV are performed, the target program ends the virtual copy process.

According to FIG. 15, the data in the copy source HDEV is copied from the copy source HDEV to the copy destination HDEV in part of the copy of the logical information of the copy source HDEV. That is, the HDEV is copied without an actual data copy from the copy source HDEV to the copy destination HDEV. Note that a series of processes from S4005 to S4008 may be performed synchronously with the copy of the HDEV or may be performed asynchronously with the copy of the HDEV after the copy of the HDEV.

Although one embodiment has been described above, this is an example for describing the present invention, and the scope of the present invention is not limited to this embodiment. The present invention can be implemented in other forms.

For example, the above description can be summarized as follows.

According to a first exemplary aspect, a storage system (500) includes a first storage device (2000A) that provides a first primary volume (5100A) to which data is input and from which the data is output, and a second storage device (2000B) that provides a first secondary volume (5100B) configuring a first replication pair with the first primary volume. In a case where the first storage device performs writing or updating of the data on the first primary volume, the first storage device transmits the data to the second storage device based on a first replication pair. In a case where the first storage device creates or updates a second primary volume (5100C) that is a snapshot of the first primary volume, the second storage device creates or updates a second secondary volume (5100D) that is a snapshot of the first secondary volume. That is, in a case where the second primary volume (5100C) is created, the second secondary volume (5100D) is created, or in a case where the second primary volume (5100C) is updated, the second secondary volume (5100D) is updated.

According to a second exemplary aspect, in the first exemplary aspect, a pair of the second primary volume and the second secondary volume is a second replication pair as a copy of the first replication pair. In the second replication pair, information for specifying data used in the second replication pair among data transmitted and received based on the first replication pair is transmitted and received.

According to a third exemplary aspect, in the first or second exemplary aspect, the first replication pair is a pair for asynchronous remote replication. The first storage device has first primary logical information (900A) that is information including a first journal number that is a number of data written to the first primary volume. The second storage device has first secondary logical information (900B) including a second journal number that is at least one of a number of data received from the first storage device for the first primary volume and a number of data reflected on the first secondary volume. The second storage device reflects differential data that is data corresponding to a difference between the second primary volume and the second secondary volume specified from a differential between the second primary logical information (900C) and the second secondary logical information (900D), on the second secondary volume. The second primary logical information is updated based on the first primary logical information when the second primary volume is created or updated. The second secondary logical information is updated based on the first secondary logical information when the second secondary volume is created or updated. The first primary logical information may include one or more first journal numbers and the one or more first journal numbers may include at least a number of data recently written to the first primary volume as one of the first journal numbers, and may include a number of data written in the past as the first journal number. The first secondary logical information may include one or more second journal numbers, the one or more second journal numbers may include at least one of a number of the data recently received from the first storage device and a number of the data recently reflected on the first secondary volume as at least one of the second journal number for the first primary volume. In addition, the one or more first journal numbers may include at least one of a number of the data received in the past and a number of the data reflected in the past as the second journal number.

According to a fourth exemplary aspect, in the third exemplary aspect, the second storage device creates the second secondary volume before performing journal reflection that reflects data received from the first storage device for the first primary volume on the first secondary volume. The second storage device reflects the differential data specified from the difference between the second primary logical information and the second secondary logical information on the second secondary volume, after performing the journal reflection on the first secondary volume.

According to a fifth exemplary aspect, in the third exemplary aspect, in the reflection on the second secondary volume of the differential data, the second storage device compares the second secondary logical information with the first secondary logical information. In a case where there is a difference between the second secondary logical information and the first secondary logical information, the second storage device reflects data included in the second storage device, which is specified from the difference, on the second secondary volume.

According to a sixth exemplary aspect, in the second exemplary aspect, the first storage device manages an attribute of data that is not referred to by any other volume among data in which the second primary volume is set as a storage destination, as exclusive possession. The second storage device manages an attribute of data that is not referred to by any other volume among data in which the second secondary volume is set as a storage destination, as exclusive possession. In a case where the second replication pair is to be deleted, the first storage device deletes data of which the attribute is exclusive with respect to the second primary volume among the data in which the second primary volume is set as the storage destination and the second storage device deletes data of which the attribute is exclusive with respect to the second primary volume among the data in which the second secondary volume is set as the storage destination.

According to a seventh exemplary aspect, in any of the first to sixth exemplary aspects, the first storage device has first primary logical to physical information (4400) that is information including a hash value of data written in the first primary volume for each logical address. The second storage device has first secondary logical to physical information (4400) that is information including a hash value of data written in the first secondary volume for each logical address. The second storage device reflects data that is already present in the second storage device specified by a difference between the second primary logical to physical information and the second secondary logical to physical information, on the second secondary volume. The second primary logical to physical information is updated based on the first primary logical to physical information when the second primary volume is created or updated. The second secondary logical to physical information is updated based on the first secondary logical to physical information when the second secondary volume is created.

According to an eighth exemplary aspect, in the seventh exemplary aspect, the second storage device reflects corresponding data on the second secondary volume by setting a reference destination of a corresponding logical address as an area where data of the same hash value as a hash value for the second primary volume, for each of one or more logical addresses having different hash values with respect to the second primary volume among a plurality of logical addresses of the second secondary volume.

What is claimed is:

1. A storage system comprising:
a first storage device that provides a first primary volume to which data is input and from which the data is output; and
a second storage device that provides a first secondary volume configuring a first replication pair with the first primary volume, wherein
in a case where the first storage device performs writing or updating of the data on the first primary volume, the first storage device transmits the data to the second storage device based on the first replication pair,
in a case where the first storage device creates or updates a second primary volume that is a snapshot of the first primary volume, the second storage device creates or updates a second secondary volume that is a snapshot of the first secondary volume configuring the first replication pair with the first primary volume,
a pair of the second primary volume and the second secondary volume is a second replication pair as a copy of the first replication pair,
in the second replication pair, information for specifying data used in the second replication pair among data transmitted and received based on the first replication pair is transmitted and received,
the first storage device manages an attribute of data that is not referred to by any other volume among data in which the second primary volume is set as a storage destination, as exclusive possession,
the second storage device manages an attribute of data that is not referred to by any other volume among data in which the second secondary volume is set as a storage destination, as exclusive possession, and
in a case where the second replication pair is to be deleted,
the first storage device deletes data of which the attribute is exclusive with respect to the second primary volume among the data in which the second primary volume is set as the storage destination, and
the second storage device deletes data of which the attribute is exclusive with respect to the second primary volume among the data in which the second secondary volume is set as the storage destination.

2. The storage system according to claim 1, wherein
the first replication pair is a pair for asynchronous remote replication,
the first storage device has first primary logical information that is information including a first journal number that is a number of data written to the first primary volume,
the second storage device has first secondary logical information including a second journal number that is at least one of a number of data received from the first storage device for the first primary volume and a number of data reflected on the first secondary volume,
the second storage device reflects differential data that is data corresponding to a difference between the second primary volume and the second secondary volume specified from a differential between the second primary logical information and the second secondary logical information, on the second secondary volume,
the second primary logical information is updated based on the first primary logical information when the second secondary volume is created or updated, and
the second secondary logical information is updated based on the first secondary logical information when the second secondary volume is created or updated.

3. The storage system according to claim 2, wherein
the second storage device creates the second secondary volume before performing journal reflection that reflects data received from the first storage device for the first primary volume on the first secondary volume, and
the second storage device reflects the differential data specified from the difference between the second primary logical information and the second secondary logical information on the second secondary volume, after performing the journal reflection on the first secondary volume.

4. The storage system according to claim 2, wherein
in the reflection on the second secondary volume of the differential data, the second storage device compares the second secondary logical information with the first secondary logical information, and in a case where there is a difference between the second secondary logical information and the first secondary logical information, the second storage device reflects data included in the second storage device, which is specified from the difference, on the second secondary volume.

5. The storage system according to claim 1, wherein
the first storage device has first primary logical to physical information that is information including a hash value of data written in the first primary volume for each logical address,
the second storage device has first secondary logical to physical information that is information including a hash value of data written in the first secondary volume for each logical address,
the second storage device reflects data that is already present in the second storage device specified by a difference between the second primary logical to physical information and the second secondary logical to physical information, on the second secondary volume,
the second primary logical to physical information is updated based on the first primary logical to physical information when the second primary volume is created or updated, and
the second secondary logical to physical information is updated based on the first secondary logical to physical information when the second secondary volume is created.

6. The storage system according to claim 5, wherein
the second storage device reflects corresponding data on the second secondary volume by setting a reference destination of a corresponding logical address as an area where data of the same hash value as a hash value for the second primary volume, for each of one or more logical addresses having different hash values with respect to the second primary volume among a plurality of logical addresses of the second secondary volume.

7. A storage device comprising:
a first storage device that provides a first primary volume to which data is input and from which the data is output, wherein
the first storage device includes:
an interface unit connected to a second storage device that provides a first secondary volume configuring a first replication pair with the first primary volume; and
a processor unit that transmits the data to the second storage device based on the first replication pair in a case where writing or updating of the data is performed on the first primary volume,
in a case where a second primary volume that is a snapshot of the first primary volume, to which the data is input and from which the data is output, is created or updated, the processor unit notifies the second storage device of the creation or the updating of the second primary volume, so that the second storage device creates or updates a second secondary volume that is a snapshot of the first secondary volume, the notification includes information for specifying the data reflected on the second primary volume among the data written or updated to the first primary volume and transmitted to the second storage device, a pair of the second primary volume and the second secondary volume is a second replication pair as a copy of the first replication pair, in the second replication pair, information for specifying data used in the second replication pair among data transmitted and received based on the first replication pair is transmitted and received, the first storage device manages an attribute of data that is not referred to by any other volume among data in which the second primary volume is set as a storage destination, as exclusive possession, the second storage device manages an attribute of data that is not referred to by any other volume among data in which the second secondary volume is set as a storage destination, as exclusive possession, and in a case where the second replication pair is to be deleted, the first storage device deletes data of which the attribute is exclusive with respect to the second primary volume among the data in which the second primary volume is set as the storage destination, and the second storage device deletes data of which the attribute is exclusive with respect to the second primary volume among the data in which the second secondary volume is set as the storage destination.

8. A storage device comprising:

a second storage device that is connected to a first storage device that provides a first primary volume to which data is input and from which the data is output, and provides a first secondary volume configuring a first replication pair with the first primary volume, wherein the second storage device includes:

an interface unit connected to the first storage device; and a processor unit that receives data written or updated to the first primary volume from the first storage device based on the first replication pair and reflects the data on the first secondary volume, the processor unit receives information specifying data related to creation or updating of a second primary volume that is a snapshot of the first primary volume from the first storage device, specifies data related to the second primary volume among the data received by the first replication pair based on the information, and creates or updates a second secondary volume that is a snapshot of the first secondary volume based on the specified data, a pair of the second primary volume and the second secondary volume is a second replication pair as a copy of the first replication pair, in the second replication pair, information for specifying data used in the second replication pair among data transmitted and received based on the first replication pair is transmitted and received, the first storage device manages an attribute of data that is not referred to by any other volume among data in which the second primary volume is set as a storage destination, as exclusive possession, the second storage device manages an attribute of data that is not referred to by any other volume among data in which the second secondary volume is set as a storage destination, as exclusive possession, and in a case where the second replication pair is to be deleted, the first storage device deletes data of which the attribute is exclusive with respect to the second primary volume among the data in which the second primary volume is set as the storage destination, and the second storage device deletes data of which the attribute is exclusive with respect to the second primary volume among the data in which the second secondary volume is set as the storage destination.

9. A storage control method that is a storage control method of a system including a first storage device that provides a first primary volume to which data is input and from which the data is output and a second storage device that provides a first secondary volume configuring a first replication pair with the first primary volume, the storage control method comprising:

transmitting the data to the second storage device based on the first replication pair in a case where the first storage device performs writing or updating of the data on the first primary volume; and creating or updating a second secondary volume that is a snapshot of the first secondary volume configuring the first replication pair with the first primary volume, by the second storage device, in a case where the first storage device creates or updates a second primary volume that is a snapshot of the first primary volume, wherein a pair of the second primary volume and the second secondary volume is a second replication pair as a copy of the first replication pair, in the second replication pair, information for specifying data used in the second replication pair among data transmitted and received based on the first replication pair is transmitted and received, the first storage device manages an attribute of data that is not referred to by any other volume among data in which the second primary volume is set as a storage destination, as exclusive possession, the second storage device manages an attribute of data that is not referred to by any other volume among data in which the second secondary volume is set as a storage destination, as exclusive possession, and in a case where the second replication pair is to be deleted, the first storage device deletes data of which the attribute is exclusive with respect to the second primary volume among the data in which the second primary volume is set as the storage destination, and the second storage device deletes data of which the attribute is exclusive with respect to the second primary volume among the data in which the second secondary volume is set as the storage destination.

10. A storage control method that is a storage control method of a first storage device that provides a first primary volume to which data is input and from which the data is output and is connected to a second storage device that provides a first secondary volume configuring a first replication pair with the first primary volume, the storage control method comprising:

transmitting the data to the second storage device based on the first replication pair in a case where writing or updating of the data is performed on the first primary volume and notifying the second storage device of the creation or the updating of the second primary volume, by a processor unit, so that the second storage device creates or updates a second secondary volume that is a snapshot of the first secondary volume, in a case where a second primary volume that is a snapshot of the first primary volume, to which the data is input and from which the data is output, is created or updated, wherein the notification includes information for specifying the data reflected on the second primary volume among the data written or updated to the first primary volume and transmitted to the second storage device, a pair of the second primary volume and the second secondary volume is a second replication pair as a copy of the first replication pair, in the second replication pair, information for specifying data used in the second replication pair among data transmitted and received based on the first replication pair is transmitted and received, the first storage device manages an attribute of data that is not referred to by any other volume among data in which the second primary volume is set as a storage destination, as exclusive possession, the second storage device manages an attribute of data that is not referred to by any other volume among data in which the second secondary volume is set as a storage destination, as exclusive possession, and in a case where the second replication pair is to be deleted,
the first storage device deletes data of which the attribute is exclusive with respect to the second primary volume among the data in which the second primary volume is set as the storage destination, and
the second storage device deletes data of which the attribute is exclusive with respect to the second primary volume among the data in which the second secondary volume is set as the storage destination.

11. A storage control method that is a storage control method of a second storage device that is connected to a first storage device that provides a first primary volume to which data is input and from which the data is output and provides a first secondary volume configuring a first replication pair with the first primary volume, the storage control method comprising:

receiving data written or updated to the first primary volume from the first storage device based on the first replication pair and reflecting the data on the first secondary volume;

receiving information specifying data related to creation or updating of a second primary volume that is a snapshot of the first primary volume from the first storage device;

specifying data related to the second primary volume among the data received by the first replication pair based on the information; and creating or updating a second secondary volume that is a snapshot of the first secondary volume based on the specified data, wherein a pair of the second primary volume and the second secondary volume is a second replication pair as a copy of the first replication pair, in the second replication pair, information for specifying data used in the second replication pair among data transmitted and received based on the first replication pair is transmitted and received, the first storage device manages an attribute of data that is not referred to by any other volume among data in which the second primary volume is set as a storage destination, as exclusive possession, the second storage device manages an attribute of data that is not referred to by any other volume among data in which the second secondary volume is set as a storage destination, as exclusive possession, and in a case where the second replication pair is to be deleted,
the first storage device deletes data of which the attribute is exclusive with respect to the second primary volume among the data in which the second primary volume is set as the storage destination, and
the second storage device deletes data of which the attribute is exclusive with respect to the second primary volume among the data in which the second secondary volume is set as the storage destination.

* * * * *